United States Patent [19]

Oguro et al.

[11] Patent Number: 5,687,276

[45] Date of Patent: Nov. 11, 1997

[54] MAGNETIC RECORDING AND/OR REPRODUCING APPARATUS FOR DETECTING FIRST AND SECOND ATTENDANT DATA INDICATIVE OF A RECORDING MODE OF ASSOCIATED DIGITAL INFORMATION

[75] Inventors: Masaki Oguro, Tokyo; Ken Iizuka; Hiroshi Ota, both of Kanagawa; Shinji Nakamura, Tokyo, all of Japan

[73] Assignee: Sony Corporation, Tokyo, Japan

[21] Appl. No.: 773,276

[22] Filed: Dec. 26, 1996

Related U.S. Application Data

[63] Continuation of Ser. No. 228,417, Apr. 15, 1994, abandoned.

[30] Foreign Application Priority Data

Apr. 23, 1993 [JP] Japan .................................. 5-097538

[51] Int. Cl.⁶ ...................................................... H04N 7/18
[52] U.S. Cl. ........................ 386/97; 386/98; 386/102; 386/104
[58] Field of Search ............................... 386/97, 98, 102, 386/104, 39; 358/343, 341

[56] References Cited

U.S. PATENT DOCUMENTS

| 4,575,772 | 3/1986 | Shimada et al. ................... 358/341 |
| 4,703,369 | 10/1987 | Moriyama et al. ................. 358/335 |
| 5,012,352 | 4/1991 | Yoshimura et al. ................ 348/341 |
| 5,132,807 | 7/1992 | Takimoto ......................... 348/343 |
| 5,414,523 | 5/1995 | Azuma et al. ..................... 348/343 |
| 5,424,850 | 6/1995 | Inoue et al. ...................... 358/343 |
| 5,438,463 | 8/1995 | Nishiumi et al. .................. 348/341 |
| 5,469,272 | 11/1995 | Kubota et al. .................... 358/343 |
| 5,471,315 | 11/1995 | Jinmai ............................. 386/97 |

FOREIGN PATENT DOCUMENTS

| 0 465 103 | 1/1992 | European Pat. Off. . |
| 0 466 399 | 1/1992 | European Pat. Off. . |
| 0 479 188 | 3/1992 | European Pat. Off. . |
| 0 503 859 | 9/1992 | European Pat. Off. . |
| 0 533 462 | 3/1993 | European Pat. Off. . |

OTHER PUBLICATIONS

Patent Abstracts of Japan vol. 16, No. 236 (E-1210) 29 May 1992, JP-A-04 047 877 (Aiwa Co.,Ltd.) 18 Feb. 1992.
Patent Abstracts of Japan vol. 15, No. 395 (P-1260) 7 Oct. 1991, JP-A-03 156 764 (Sony Corp.) 4 Jul. 1991.

*Primary Examiner*—Tommy P. Chin
*Assistant Examiner*—Anand Rao
*Attorney, Agent, or Firm*—William S. Frommer; Alvin Sinderbrand

[57] ABSTRACT

An apparatus for recording digital information comprises recording data generator for producing recording digital information data containing at least one of digital video information data accompanied with first attendant data added thereto and digital audio information data accompanied with second attendant data added thereto, a recording portion operative to record the recording digital information data on a record medium, and a controller operative to set selectively a plurality of recording modes for the recording of the recording digital information data on the record medium carried out by the recording portion. The first and second attendant data contain recording mode data having a code selected to correspond to the recording mode set by the controller. An apparatus for reproducing digital information is operative to reproduce the recording digital information data from the record medium and process the reproduced recording digital information data, in response to reproduced first and second attendant data, to reproduce video and audio signals.

11 Claims, 21 Drawing Sheets

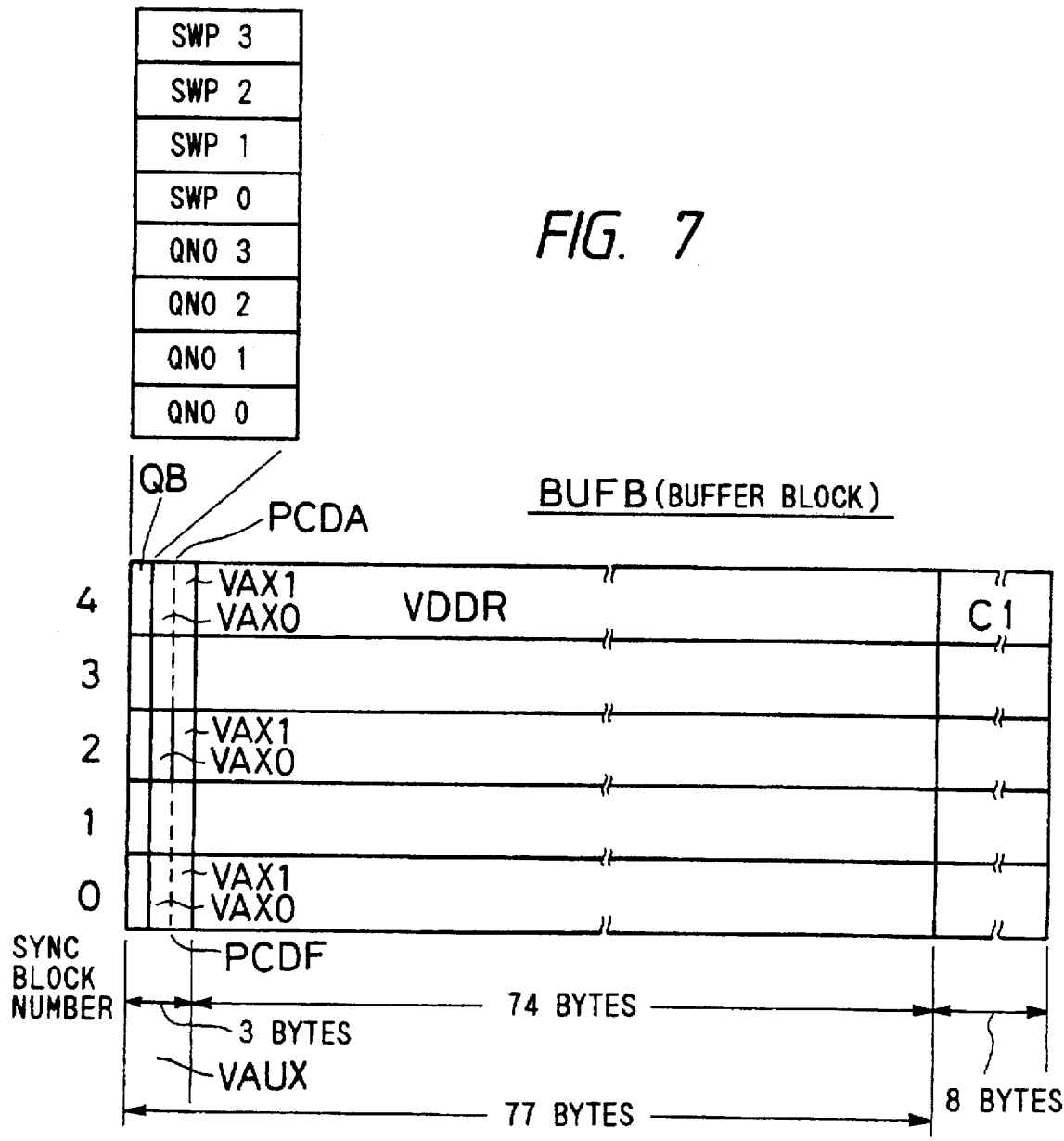

FIG. 10

PCDF/ PCDA

| WORD NAME | (MSB) PACK TITLE (LSB) |
|---|---|
| PC0 | ( PACK HEADER DATA ) |
| PC1 | ( PACK DATA ) |
| PC2 | ( PACK DATA ) |
| PC3 | ( PACK DATA ) |
| PC4 | ( PACK DATA ) |

FIG. 11

S.P. FOR VAUX

| WORD NAME | | | | | | | | |
|---|---|---|---|---|---|---|---|---|
| PC0 | 0 | 1 | 1 | 0 | 0 | 1 | 0 | 0 |
| PC1 | SCMS | | DUB SOURCE | | DUB GEN | | | |
| PC2 | REC ST | | REC MODE | | PHOTO | | | |
| PC3 | LINE ID | | | | | DISP | | |
| PC4 | | | | | | | | |

FIG. 12

S.P. FOR AAUX

| WORD NAME | | | | | | | | |
|---|---|---|---|---|---|---|---|---|
| PC0 | 0 | 1 | 1 | 1 | 0 | 1 | 0 | 0 |
| PC1 | SCMS | | DUB SOURCE | | DUB GEN | | | |
| PC2 | REC ST | REC END | REC MODE | | | | | |
| PC3 | | | | | | | | |
| PC4 | | | | | | | | |

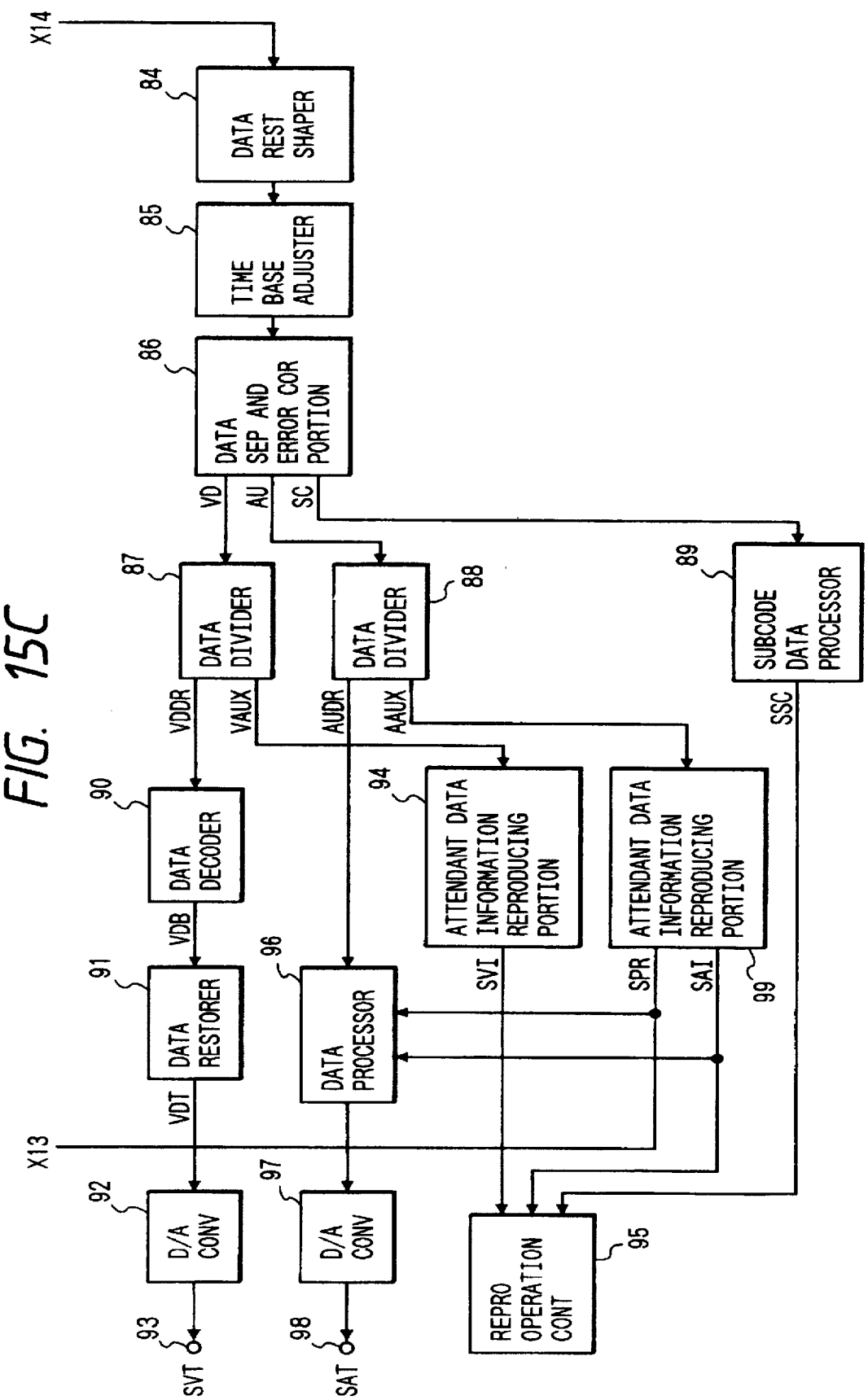

FIG. 16

S.P. FOR AAUX

| PC0 | 0 | 1 | 1 | 1 | 0 | 0 | 1 | 1 |
|-----|---|---|---|---|---|---|---|---|
| PC1 | 50/60 | SYNC | AU SIZE | | | | | |
| PC2 | HD | CH | | PA L R | AUDIO MODE | | | |
| PC3 | EMP | | SMP | | | QU | | |
| PC4 | | | | | | | | |

FIG. 17

| AUDIO SIGNAL MODE (AA1\|AA2) | | AA1 | | | | | AA2 | | | | |
|---|---|---|---|---|---|---|---|---|---|---|---|
| | | PAIR | AUDIO MODE | | | | PAIR | AUDIO MODE | | | |
| 3-1 SYSTEM | L R C S | 1 | 0 | 0 | 0 | 1 | 1 | 0 | 0 | 1 | 1 |
| 2-2 SYSTEM | LF RF LR RR | 1 | 0 | 0 | 0 | 1 | 1 | 0 | 1 | 0 | 0 |
| 3-CHANNEL | L R C X | 1 | 0 | 0 | 0 | 1 | 1 | 0 | 1 | 0 | 1 |
| 3-CHANNEL +MONAURAL | L R C M | 1 | 0 | 0 | 0 | 1 | 1 | 0 | 1 | 1 | 0 |
| STEREO | L R X X | 0 | 0 | 0 | 0 | 1 | 0 | 1 | 1 | 1 | 1 |
| STEREO +STEREO | L1 R1 L2 R2 | 0 | 0 | 0 | 0 | 1 | 0 | 0 | 0 | 0 | 1 |
| STEREO +MONAURAL | L R M X | 0 | 0 | 0 | 0 | 1 | 0 | 0 | 0 | 0 | 0 |
| STEREO +BILINGUAL | L R M1 M2 | 0 | 0 | 0 | 0 | 1 | 0 | 0 | 0 | 1 | 0 |
| MONAURAL | M X X X | 0 | 0 | 0 | 0 | 0 | 0 | 1 | 1 | 1 | 1 |
| BILINGUAL | M1 M2 X X | 0 | 0 | 0 | 1 | 0 | 0 | 1 | 1 | 1 | 1 |
| BILINGUAL +MONAURAL | M1 M2 M X | 0 | 0 | 0 | 1 | 0 | 0 | 0 | 0 | 0 | 0 |
| BILINGUAL +BILINGUAL | M1 M2 M1' M2' | 0 | 0 | 0 | 1 | 0 | 0 | 0 | 0 | 1 | 0 |

5,687,276

MAGNETIC RECORDING AND/OR REPRODUCING APPARATUS FOR DETECTING FIRST AND SECOND ATTENDANT DATA INDICATIVE OF A RECORDING MODE OF ASSOCIATED DIGITAL INFORMATION

This application is a continuation of application Ser. No. 08/228,417, filed Apr. 15, 1994, now abandoned.

BACKGROUND OF THE INVENTION

1. Field of the Invention

The present invention relates generally to apparatus for recording and/or reproducing digital information, and more particularly to a digital information recording and/or reproducing apparatus which is operative selectively to digitalize video and audio signals for producing digital video and audio information data and to record the digital video and audio information data on a record medium or to read digital video and audio information data from a record medium on which the digital video and audio information data are recorded and to reproduce video and audio signals from the digital video and audio information data read from the record medium.

2. Description of the Prior Art

In the field of a video tape recorder (VTR) which is operative to record video and audio signals constituting a television broadcast signal on a magnetic tape and/or to reproduce video and audio signals from a magnetic tape on which the video and audio signals are recorded, it is proposed to adopt a digital recording system by which such various advantages that pictures and sound obtained based on video and audio signals reproduced from a magnetic tape are improved in their quality, high density recording of video and audio signals are achieved on a magnetic tape, diverse information can be recorded on a magnetic tape together with video and audio signals are obtained. A VTR to which the digital recording system is applied is commonly called a digital VTR. In such a digital VTR, video and audio signals constituting a television broadcast signal are digitalized to produce digital video and audio information data, respectively, and then recording digital information data which contain the digital video and audio information data are formed to be recorded on a magnetic tape.

When the recording digital information data containing the digital video and audio information data are recorded on the magnetic tape in the digital VTR, the magnetic tape is scanned by a rotary magnetic head to which the recording digital information data are supplied and a plurality of record tracks extending in parallel with one another are successively formed on the magnetic tape by each scanning of the rotary magnetic head so as to incline to the direction along which the magnetic tape extends, in the same manner as the recording in an ordinary VTR. For the recording in the digital VTR, several data distribution manners can be considered for distributing the recording digital information data to each record track formed on the magnetic tape. It has been proposed as one of such data distributing manners to record one unit section of the recording digital information data, which contains a digital video information data section corresponding to one frame period of the video signal (hereinafter referred to as digital video information data frame section) and a digital audio information data section corresponding to the digital video information data frame section, on a record track group consisting of ten record tracks arranged to be adjacent successively to each other on a magnetic tape.

In the case where each unit section of the recording digital information data, which contains the digital video information data frame section and one digital audio information data section corresponding to the digital video information data frame section, is recorded on the record track group consisting of adjacent ten of record tracks formed on the magnetic tape in such a manner as mentioned above, as shown in FIG. 1, the magnetic tape which is designated by MT and runs in the direction indicated by an arrow TR is scanned by a rotary magnetic head moving in the direction indicated by an arrow HS so that record tracks which constitute a plurality of record track groups of ten adjacent record tracks KT are successively formed and recording areas AA1, AA2 and VA are allocated on each record track group of ten adjacent record tracks KT. The recording area AA1 is formed by portions of the first five of ten adjacent record tracks KT of each record track group on the side of beginning ends thereof and the recording area AA2 is formed by portions of another five of ten adjacent record tracks KT of each record track group on the side of beginning ends thereof. Further, the recording area VA is formed by portions of ten adjacent record tracks KT of each record track group other than the portions forming the recording areas AA1 and AA2.

In a recording mode wherein the recording digital information data which contain the digital video and audio information data obtained based on the video and audio signals constituting the television broadcast signal are recorded on the magnetic tape (hereinafter referred to as original recording mode), the digital video information data frame section is recorded on the recording area VA and the digital audio information data section corresponding to that digital video information data frame section is recorded on one or both of the recording areas AA1 and AA2. In a recording mode wherein, after the digital video information data frame section and the digital audio information data section corresponding to that digital video information data frame section are recorded on the recording area VA and one or both of the recording areas AA1 and AA2, respectively, additional recording digital information data which contain digital audio information data obtained based on another audio signal are recorded on the magnetic tape (hereinafter referred to as after recording mode), the digital audio information data contained in the additional recording digital information data are recorded on the recording area AA2 in addition to the digital audio information data section having been recorded on the recording area AA1. In a recording mode wherein, after the digital video information data frame section and the digital audio information data section corresponding to that digital video information data frame section are recorded on the recording area VA and one or both of the recording areas AA1 and AA2, respectively, further recording digital information data which contain digital audio information data obtained based on another audio signal are recorded on the magnetic tape so as to substitute for the digital audio information data section recorded on the magnetic tape (hereinafter referred to as insert recording mode), the digital audio information data contained in the further recording digital information data are recorded on the recording area AA1 in place of the digital audio information data section recorded previously thereon. Further, in a recording mode wherein recording digital information data containing digital audio information data are recorded on the magnetic tape prior to the recording of the digital video information data frame section (hereinafter referred to as VOS recording mode), the digital audio information data contained in the recording digital information data are recorded on the recording area AA2 before the digital video information data frame section are recorded on the recording area VA.

With the digital VTR by which the data distributing manner wherein each unit section of the recording digital information data, which contains the digital video information data section and the digital audio information data section corresponding to the digital video information data frame section, is recorded on the record track group consisting of ten adjacent record tracks as described above is adopted, the digital audio information data are recorded on the magnetic tape MT under one of various recording modes including the original recording mode, the after recording mode, the insert recording mode and the VOS recording mode. Accordingly, when the digital video and audio information data are reproduced from the magnetic tape MT on which the digital video and audio information data have been recorded, it is very advantageous and convenient for processing the digital video and audio information data reproduced from the magnetic tape MT to have a knowledge of the recording mode through which the digital audio information data have been recorded on the magnetic tape MT. Consequently, it is desired that the recording mode through which the digital audio information data have been recorded on the magnetic tape MT can be easily detected.

However, in the digital VTRs proposed previously, any specific arrangement by which the recording mode through which the digital audio information data have been recorded on the magnetic tape MT can be easily detected when the digital video and audio information data are reproduced from the magnetic tape MT is not provided, and therefore, a complicated method is used for processing the digital video and audio information data reproduced from the magnetic tape MT appropriately in the manner suitable for the recording mode.

Further, under the original recording mode in the digital VTR by which the data distributing manner wherein each unit section of the recording digital information data, which contains the digital video information data frame section and the digital audio information data section corresponding to the digital video information data frame section, is recorded on the record track group consisting of ten adjacent record tracks is adopted, the digital audio information data section is recorded on either only the recording area AA1 or both of the recording areas AA1 and AA2 on the magnetic tape MT in the form of two separated subsections in response to an audio signal mode, that is, the mode of the audio signal which is to be recorded and from which the recording digital information data are obtained. Besides, in the case where the digital audio information data section is recorded on both of the recording areas AA1 and AA2 in the form of two separated subsections, two different recording states of the digital audio information data are selectively established in response to the audio signal mode. In one of the recording states, the subsections recorded on the recording areas AA1 and AA2 respectively are correlative with each other, and in the other of the recording states, the subsections recorded on the recording areas AA1 and AA2 respectively are not correlative but independent respectively.

For example, when the audio signal to be recorded is a four-channel stereo signal containing a front left signal, a front right signal, a rear left signal and a rear right signal, digital audio information data section obtained based on the front left, front right, rear left and rear right signals is recorded on the recording areas AA1 and AA2 with a subsection corresponding to the front left and front right signals recorded on the recording area AA1 and a subsection corresponding to the rear left and rear right signals recorded on the recording area AA1. In this case, the subsections recorded on the recording areas AA1 and AA2 respectively are correlative with each other. On the other hand, when the audio signal to be recorded includes first and second two-channel stereo signals each containing a left signal and a right signal, digital audio information data section obtained based on a first pair of left and right signals and a second pair of left and right signals is recorded on the recording areas AA1 and AA2 with a subsection corresponding to the first pair of left and right signals recorded on the recording area AA1 and a subsection corresponding to the rear left and rear right signals recorded on the recording area AA1. In this case, the subsections recorded on the recording areas AA1 and AA2 respectively are independent respectively.

The recording areas AA1 are AA2 on the magnetic tape MT are also used for recording the digital audio information data contained in the additional recording digital information data under the after recording mode or for recording the digital audio information data contained in the further recording digital information data under the insert recording mode. Under the after recording mode, the digital audio information data section corresponding to the digital video information data frame section is recorded on the recording area AA1 or the recording areas AA1 and AA2 in the form of subsections and then the digital audio information data contained in the additional recording digital information data are recorded on the recording area AA2 in the form of a subsection in addition to the subsection having been recorded on the recording area AA1. Under the insert recording mode, the digital audio information data section corresponding to the digital video information data frame section is recorded on the recording area AA1 or the recording areas AA1 and AA2 in the form of subsections and then the digital audio information data contained in the further recording digital information data are recorded on the recording area AA1 in the form of another subsection in place of the digital audio information data section recorded previously thereon.

In consideration of the recording of the digital audio information data on the magnetic tape MT performed under the after recording mode or the insert recording mode as mentioned above, it is very advantageous and convenient that the magnetic tape MT is so arranged that the recording state of the digital audio information data wherein the subsections recorded on the recording areas AA1 and AA2 respectively are correlative with each other or the subsections recorded on the recording areas AA1 and AA2 respectively are not correlative but independent respectively can be easily detected.

For example, when the recording of the digital audio information data on the magnetic tape MT on which the digital video and audio information data have already been recorded is performed under the after recording mode, the digital audio information data contained in the additional recording digital information data are recorded on the recording area AA2 in the form of the subsection in addition to the subsection recorded on the recording area AA1. In such a case, if the subsections which have been recorded on the recording areas AA1 and AA2, respectively, before the recording under the after recording mode are correlative with each other, the correlation between the subsections having been recorded on the recording areas AA1 and AA2, respectively, is destroyed by the recording under the after recording mode and the subsections on the recording areas AA1 and AA2 after the recording under the after recording mode are not correlative. Therefore, if the recording under the after recording mode is carelessly carried out, it is feared that the subsections on the recording areas AA1 and AA2 after the recording under the after recording mode are useless.

Consequently, it is desired that the damages resulting from the recording under the after recording mode carried out carelessly are surely prevented. In this connection, if each of the recording state of the digital audio information data on the magnetic tape MT wherein the subsections recorded on the recording areas AA1 and AA2 respectively are correlative with each other and the recording state of the digital audio information data on the magnetic tape MT wherein the subsections recorded on the recording areas AA1 and AA2 respectively are not correlative but independent respectively can be selectively detected easily to produce a detected output, the subsections which have been recorded respectively on the recording areas AA1 and AA2 to be correlative with each other and must not be subjected to the recording under the after recording mode can be protected from the careless recording under the after recording mode with the detected output of the recording state of the digital audio information data on the magnetic tape MT.

Further, the detected output of the recording state of the digital audio information data on the magnetic tape MT, which can be easily obtained, may be effectively used for processing the digital video and audio information data reproduced from the magnetic tape MT.

However, in the digital VTRs proposed previously, any specific arrangement by which the magnetic tape MT is so arranged that each of the recording state of the digital audio information data on the magnetic tape MT wherein the subsections recorded on the recording areas AA1 and AA2 respectively are correlative with each other and the recording state of the digital audio information data on the magnetic tape MT wherein the subsections recorded on the recording areas AA1 and AA2 respectively are not correlative but independent respectively can be selectively detected easily, is not provided, and therefore, the fear of the damages resulting from the recording under the after recording mode carried out carelessly has not been eliminated.

OBJECTS AND SUMMARY OF THE INVENTION

Accordingly, it is an object of the present invention to provide an apparatus for recording and/or reproducing digital information, which can be operative selectively to record on a record medium digital video and audio information data obtained by digitalizing video and audio signals and to reproduce digital video and audio information data from a record medium on which the digital video and audio information data have been recorded to obtain reproduced video and audio signals, and with which the aforementioned disadvantages or problems encountered with the prior art are avoided.

Another object of the present invention is to provide an apparatus for recording digital information, which can be operative to record on a record medium digital video and audio information data obtained by digitalizing video and audio signals, and by which the recording medium is so arranged that a recording mode through which the digital audio information data have been recorded on the record medium can be easily detected on the occasion of reproduction of the digital video and audio information data from the record medium.

A further object of the present invention is to provide an apparatus for recording digital information, which can be operative to record on a record medium digital video and audio information data obtained by digitalizing video and audio signals, and by which the record medium is so arranged that each of a recording state of the digital audio information data on the record medium wherein subsections of the digital audio information data recorded respectively on two recording areas allocated on each record track group of a plurality of adjacent record tracks formed on the recording medium are correlative with each other and a recording state of the digital audio information data on the record medium wherein subsections of the digital audio information data recorded respectively on two recording areas allocated on each record track group of a plurality of adjacent record tracks formed on the recording medium are not correlative but independent respectively can be selectively detected easily.

A further object of the present invention is to provide an apparatus for reproducing digital information, which can be operative to reproduce digital video and audio information data obtained by digitalizing video and audio signals from a record medium on which the digital video and audio information data have been recorded to obtain reproduced video and audio signals, and by which a recording mode through which the digital audio information data have been recorded on the record medium can be easily detected on the occasion of reproduction of the digital video and audio information data from the record medium.

A further object of the present invention is to provide an apparatus for reproducing digital information, which can be operative to reproduce digital video and audio information data obtained by digitalizing video and audio signals from a record medium on which the digital video and audio information data have been recorded to obtain reproduced video and audio signals, and by which each of a recording state of the digital audio information data on the record medium wherein subsections of the digital audio information data recorded respectively on two recording areas allocated on each record track group of a plurality of adjacent record tracks formed on the recording medium are correlative with each other and a recording state of the digital audio information data on the record medium wherein subsections of the digital audio information data recorded respectively on two recording areas allocated on each record track group of a plurality of adjacent record tracks formed on the recording medium are not correlative but independent respectively can be selectively detected easily.

A further object of the present invention is to provide an apparatus for recording and reproducing digital information, which can be operative to record on a record medium digital video and audio information data obtained by digitalizing video and audio signals and to reproduce the digital video and audio information data from the record medium, and by which the recording medium is so arranged that a recording mode through which the digital audio information data have been recorded on the record medium can be easily detected on the occasion of reproduction of the digital video and audio information data from the record medium, and the recording mode through which the digital audio information data have been recorded on the record medium can be easily detected when the digital video and audio information data are reproduced from the record medium.

A still further object of the present invention is to provide an apparatus for recording and reproducing digital information, which can be operative to record on a record medium digital video and audio information data obtained by digitalizing video and audio signals and to reproduce the digital video and audio information data from the record medium, and by which the recording medium is so arranged that the record medium is so arranged that each of a recording state of the digital audio information data on the record medium wherein subsections of the digital audio information data recorded respectively on two recording areas allocated on each record track group of a plurality of adjacent record tracks formed on the recording medium are correlative with each other and a recording state of the digital audio information data on the record medium wherein subsections of the digital audio information data recorded respectively on two recording areas allocated on each record track group of a plurality of adjacent record tracks formed on the recording medium are not correlative but independent respectively can be selectively detected easily, and each of the recording state of the digital audio information data on the record medium wherein subsections of the digital audio information data recorded respectively on two recording areas allocated on each record track group of a plurality of adjacent record tracks formed on the recording medium are correlative with each other and the a recording stats of the digital audio information data on the record medium wherein subsections of the digital audio information data recorded respectively on two recording areas allocated on each record track group of a plurality of adjacent record tracks formed on the recording medium are not correlative but independent respectively can be selectively detected easily.

According to the present invention, there is provided, as a first recording apparatus, an apparatus for recording digital information, which comprises a video signal digitalizing portion for digitalizing a video signal to produce digital video information data based on the video signal, an audio signal digitalizing portion for digitalizing an audio signal to produce digital audio information data based on the audio signal, an attendant data generating portion for producing first attendant data to be added to the digital video information data and second attendant data to be added to the digital audio information data, a recording data generating portion for producing recording digital information data containing at least one of the digital video information data accompanied with the first attendant data added thereto and the digital audio information data accompanied with the second attendant data added thereto, a recording portion operative to record the recording digital information data on a record medium, and a recording mode controller operative to setting selectively a plurality of recording modes for the recording of the recording digital information data on the record medium carried out by the recording portion, wherein the attendant data generating portion is operative to produce the first and second attendant data so as to contain recording mode data having a code selected to correspond to the recording mode set by the record mode controller.

There is also provided according to the present invention, as a second recording apparatus, an apparatus for recording digital information, which comprises a video signal digitalizing portion for digitalizing a video signal to produce digital video information data based on the video signal, an audio signal digitalizing portion for digitalizing an audio signal to produce digital audio information data based on the audio signal, an attendant data generating portion for producing first attendant data to be added to the digital video information data and second attendant data to be added to the digital audio information data, a recording data generating portion for producing recording digital information data containing at least one of the digital video information data accompanied with the first attendant data added thereto and the digital audio information data accompanied with the second attendant data added thereto, a recording portion operative to record the recording digital information data on a record medium, and a recording mode controller operative to setting selectively a plurality of recording modes for the recording of the recording digital information data on the record medium carried out by the recording portion, wherein the attendant data generating portion is operative to produce the second attendant data so as to contain specific mode data indicating whether or not the audio signal supplied to the audio signal digitalizing portion is of a specific audio signal mode.

There is further provided according to the present invention, as a first reproducing apparatus, an apparatus for reproducing digital information, which comprises a reproducing portion operative to reproduce recording digital information data containing digital video information data accompanied with first attendant data added thereto and digital audio information data accompanied with second attendant data added thereto from a record medium on which the recording digital information data have been recorded, a data separating portion for separating at least one of the digital video information data accompanied with the first attendant data added thereto and the digital audio information data accompanied with the second attendant data added thereto from the recording digital information data reproduced by the reproducing portion, a first data dividing portion for dividing the digital video information data accompanied with the first attendant data added thereto into the digital video information data and the first attendant data, a second data dividing portion for dividing the digital audio information data accompanied with the second attendant data added thereto into the digital audio information data and the second attendant data, a video data processing portion for processing the digital video information data obtained from the first data dividing portion to produce a video signal, an audio data processing portion for processing the digital audio information data obtained from the second data dividing portion to produce an audio signal, an attendant data information reproducing portion for obtaining information based on the first and second attendant data obtained from the first and second data dividing portions, respectively, and including a part thereof corresponding to a code of recording mode data contained in the first and second attendant data.

There is further provided according to the present invention, as a second reproducing apparatus, an apparatus for reproducing digital information, which comprises a reproducing portion operative to reproduce recording digital information data containing digital video information data accompanied with first attendant data added thereto and digital audio information data accompanied with second attendant data added thereto from a record medium on which the recording digital information data have been recorded, a data separating portion for separating at least one of the digital video information data accompanied with the first attendant data added thereto and the digital audio information data accompanied with the second attendant data added thereto from the recording digital information data reproduced by the reproducing portion, a first data dividing portion for dividing the digital video information data accompanied with the first attendant data added thereto into the digital video information data and the first attendant data, a second data dividing portion for dividing the digital audio information data accompanied with the second attendant data added thereto into the digital audio information data and the second attendant data, a video data processing portion for processing the digital video information data obtained from the first data dividing portion to produce a video signal, an audio data processing portion for processing the digital audio information data obtained from the second data dividing portion to produce an audio signal, an attendant data information reproducing portion for obtaining information based on the first and second attendant data obtained from the first and second data dividing portions, respectively, and including a part thereof corresponding to specific mode data contained in the second attendant data.

There is further provided according to the present invention, as a first recording and reproducing apparatus, an apparatus for recording and reproducing digital information, which includes a recording portion comprising structural components corresponding substantially to main structural components of the first recording apparatus mentioned above and a reproducing portion comprising structural components corresponding substantially to main structural components of the first reproducing apparatus mentioned above.

There is still further provided according to the present invention, as a second recording and reproducing apparatus, an apparatus for recording and reproducing digital information, which includes a recording portion comprising structural components corresponding substantially to main structural components of the second recording apparatus mentioned above and a reproducing portion comprising structural components corresponding substantially to main structural components of the second reproducing apparatus mentioned above.

In the first recording apparatus constituted as described above in accordance with the present invention, the first and second attendant data added respectively to the digital video and audio information data contained in the recording digital information data are produced to contain the recording mode data having the code selected to correspond to the recording mode which is set by the record mode controller on the occasion of the recording of the digital audio information data and recorded on the record medium together with the digital video and audio information data. Accordingly, the recording mode through which the digital audio information data have been recorded on the record medium can be very easily detected based on the code of the recording mode data contained in the first attendant data which are reproduced together with the digital video information data and the second attendant data which are reproduced together with the digital audio information data when the digital video and audio information data are reproduced from the recording medium on which the digital video information data accompanied with the first attendant data added thereto and the digital audio information data accompanied with the second attendant data added thereto have been recorded.

In the second recording apparatus constituted as described above in accordance with the present invention, the second attendant data added to the digital audio information data contained in the recording digital information data are produced to contain the specific mode data indicating whether or not the audio signal supplied to the audio signal digitalizing portion is of the specific audio signal mode and recorded on the record medium together with the digital audio information data. Accordingly, it can be very easily detected based on the specific mode data contained in the second attendant data which are reproduced together with the digital audio information data whether or not the audio signal from which the digital audio information data have originated is of the specific audio signal mode when the recording digital information data are reproduced from the recording medium on which the digital audio information data accompanied with the second attendant data added thereto have been recorded, together with the digital video information data accompanied with the first attendant data added thereto or alone, in the form of the recording digital information data.

Further, in the second recording apparatus, the recording state of the digital audio information data on the record medium wherein the subsections of the digital audio information data recorded respectively on two recording areas allocated on each record track group of a plurality of adjacent record tracks formed on the recording medium are correlative with each other and the recording state of the digital audio information data on the record medium wherein the subsections of the digital audio information data recorded respectively on two recording areas allocated on each record track group of a plurality of adjacent record tracks formed on the recording medium are selectively established in response to the signal mode of the audio signal from which the digital audio information data have originated. In the case where the audio signal is of the specific audio signal mode, the recording state wherein the subsections of the digital audio information data recorded respectively on two recording areas allocated on each record track group of a plurality of adjacent record tracks formed on the recording medium are correlative with each other is established.

Consequently, each of the recording state wherein the subsections of the digital audio information data recorded respectively on two recording areas allocated on each record track group of a plurality of adjacent record tracks formed on the recording medium are correlative with each other and the recording state wherein the subsections of the digital audio information data recorded respectively on two recording areas allocated on each record track group of a plurality of adjacent record tracks formed on the recording medium are not correlative but independent respectively can be selectively detected very easily based on the specific mode data contained in the second attendant data which are reproduced together with the digital audio information data.

In the first reproducing apparatus constituted as described above in accordance with the present invention, the information obtained, based on the first and second attendant data from the first and second data dividing portions, from the attendant data information reproducing portion include the part thereof corresponding to the code of the recording mode data contained in the first attendant data reproduced together with the digital video information data and the second attendant data reproduced together with the digital audio information data. Accordingly, the recording mode through which the digital audio information data have been recorded on the record medium can be very easily detected based on the code of the recording mode data included in the part of the information obtained from the attendant data information reproducing portion.

In the second reproducing apparatus constituted as described above in accordance with the present invention, the information obtained, based on the first and second attendant data from the first and second data dividing portions, from the attendant data information reproducing portion include the part thereof corresponding to the specific mode data contained in the second attendant data reproduced together with the digital audio information data. Accordingly, each of the recording state wherein the subsections of the digital audio information data recorded respectively on two recording areas allocated on each record track group of a plurality of adjacent record tracks formed on the recording medium are correlative with each other and the recording state wherein the subsections of the digital audio information data recorded respectively on two recording areas allocated on each record track group of a plurality of adjacent record tracks formed on the recording medium are not correlative but independent respectively can be selectively detected very easily based on the specific mode data included in the part of the information obtained from the attendant data information reproducing portion.

With the first recording and reproducing apparatus constituted as described above in accordance with the present invention, since the recording portion comprising the structural components corresponding substantially to the main structural components of the first recording apparatus and the reproducing portion comprising the structural components corresponding substantially to the main structural components of the first reproducing apparatus are provided, effect and advantages which correspond to those obtained by each of the first recording apparatus and the first reproducing apparatus as mentioned above are also obtained.

Similarly, with the second recording and reproducing apparatus constituted as described above in accordance with the present invention, since the recording portion comprising the structural components corresponding substantially to the main structural components of the second recording apparatus and the reproducing portion comprising the structural components corresponding substantially to the main structural components of the second reproducing apparatus are provided, effect and advantages which correspond to those obtained by each of the second recording apparatus and the second reproducing apparatus as mentioned above are also obtained.

The above, and other objects, features and advantages of the present invention will become apparent from the following detailed description which is to be read in conjunction with the accompanying drawings.

BRIEF DESCRIPTION OF THE DRAWINGS

FIGS. 3, 4A to 4D, 5, 6A, 6B, 7, 8, 9A, 9B and 10 are illustrations each showing a data format of digital information data used in the embodiments shown in FIGS. 1, 14 and 15A, 15B and 15C;

FIGS. 11 and 12 are illustrations each showing a data format of digital information data used in the embodiments shown in FIGS. 2A, 2B and 14;

FIGS. 15A, 15B and 15C are block diagrams showing of apparatus for recording and reproducing digital information which includes another embodiment of apparatus for recording digital information according to the present invention and another embodiment of apparatus for reproducing digital information according to the present invention; and FIGS. 16 and 17 are illustrations each showing a data format of digital information data used in the apparatus shown in FIGS. 15A, 15B and 15C.

DESCRIPTION OF THE PREFERRED EMBODIMENTS

Figure 2A:
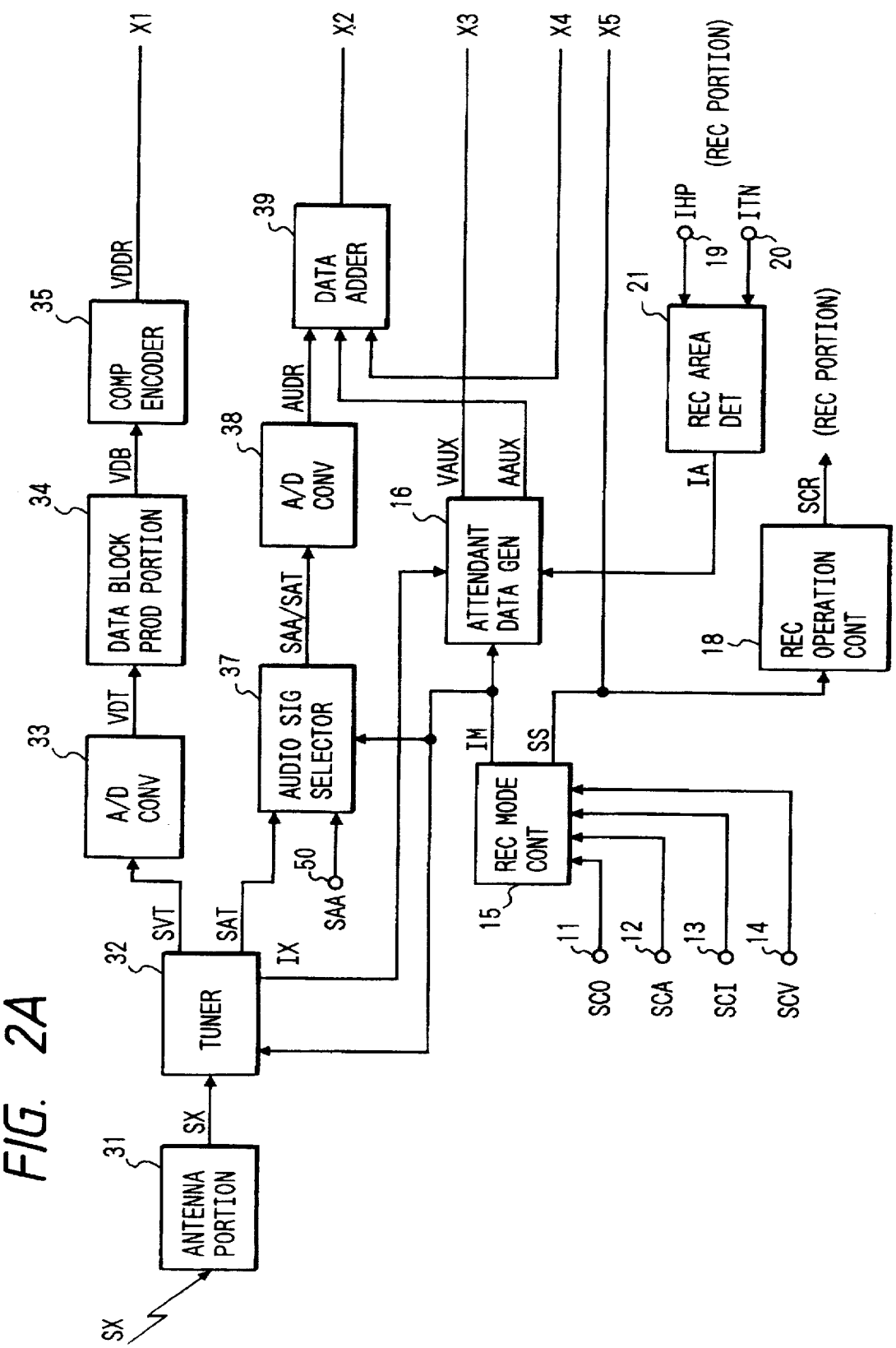
FIGS. 2A and 2B are block diagrams showing one embodiment of apparatus for recording digital information according to the present invention.
Figure 2B:
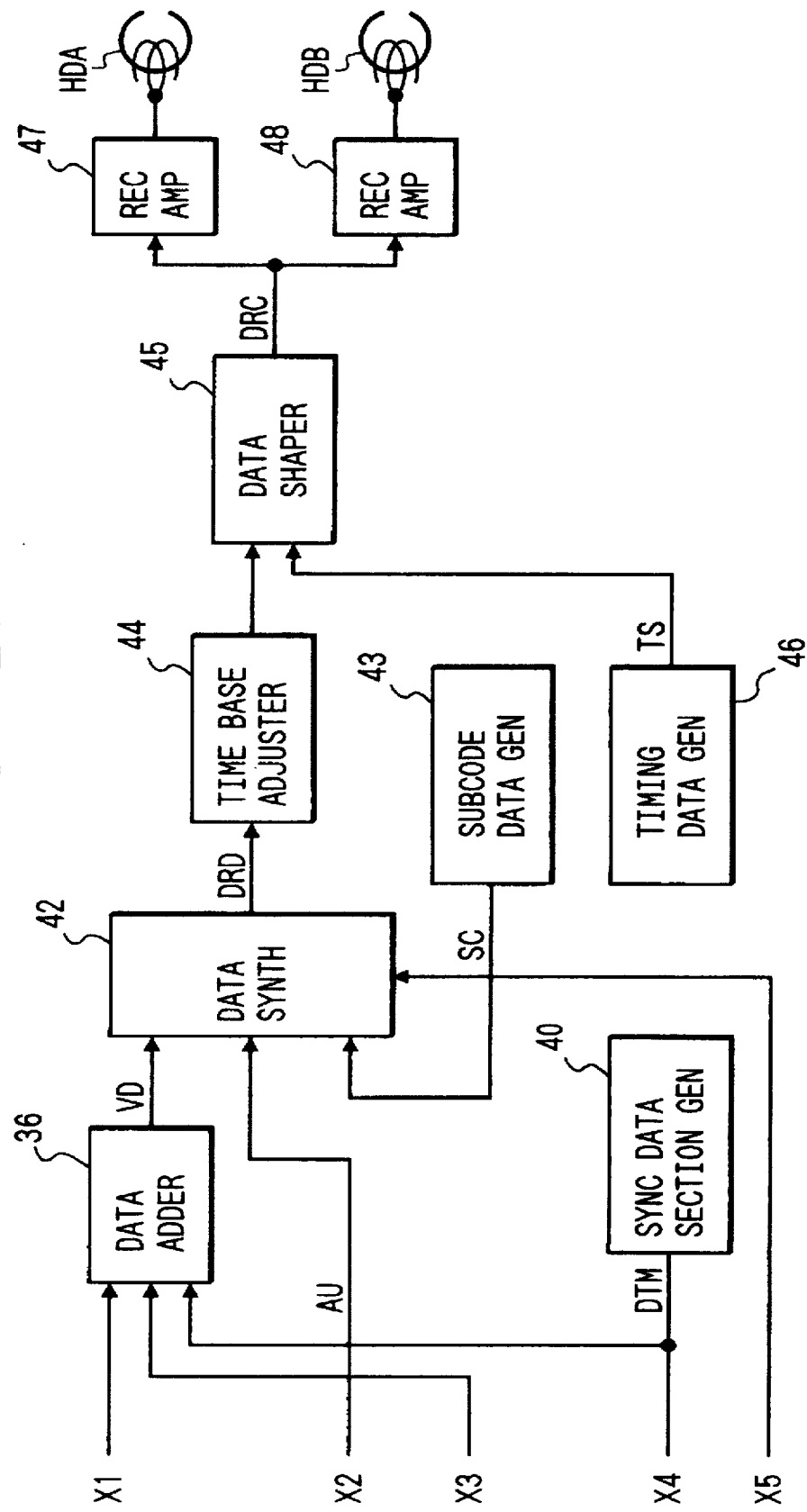

FIGS. 2A and 2B show an embodiment of apparatus for recording digital information according to the present invention.

Referring to FIGS. 2A and 2B, a pair of rotary magnetic heads HDA and HDB are provided, and recording digital information data which contain digital video data formed based on a video signal and accompanied with a first attendant data added thereto and digital audio data formed based on an audio signal and accompanied with a second attendant data added thereto are recorded on a magnetic tape by the rotary magnetic heads HDA and HDB. In the recording of the recording digital information data on the magnetic tape, such a distributing manner in which one unit section of the recording digital information data, which contains a digital video information data frame section and a digital audio information data section corresponding to the digital video information data frame section, is recorded on each record track group consisting of adjacent ten of record tracks formed on the magnetic tape, is adopted. For the recording of the digital audio information data, one of an original recording mode, an after recording mode, an insert recording mode and a VOS recording mode is selected.

Figure 1:
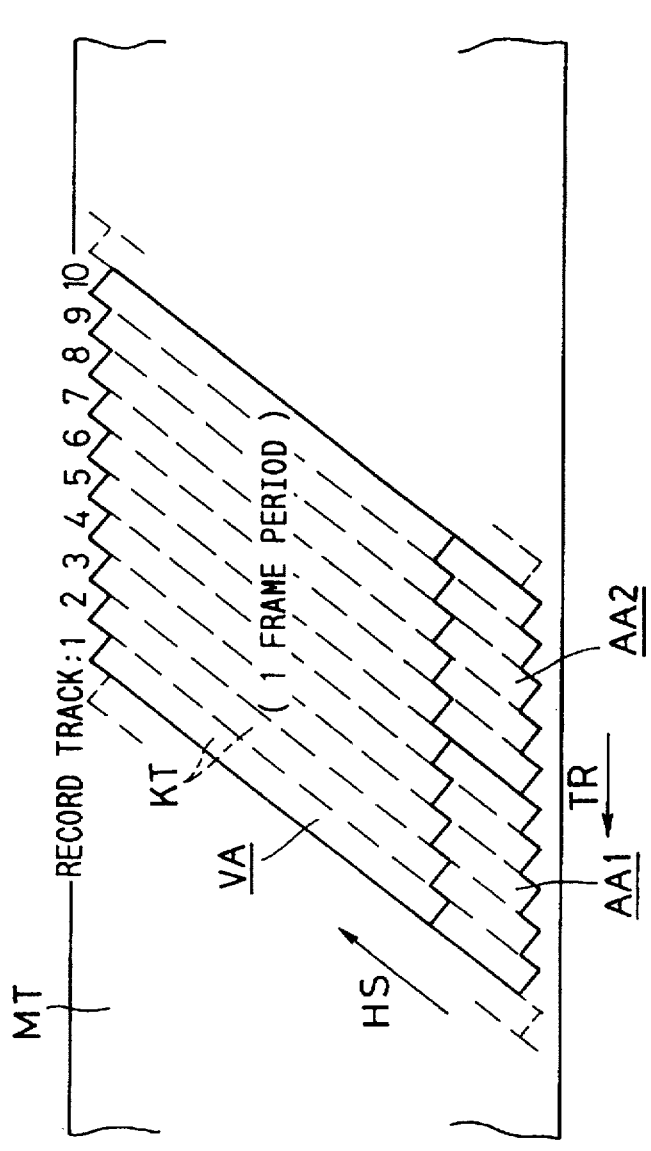
FIG. 1 is an illustration used for explaining digital information recording carried out in an embodiment of apparatus for recording digital information according to the present invention.

When the digital video and audio information data are recorded on the magnetic tape by the embodiment shown in FIG. 2, as shown in FIG. 1, the magnetic tape which is designated by MT and runs in the direction indicated by an arrow TR is scanned by each of the rotary magnetic heads HDA and HDB moving in the direction indicated by an arrow HS so that record tracks which constitute a plurality of record track groups each consisting of ten adjacent record tracks KT are successively formed and recording areas AA1, AA2 and VA are allocated on each record track group of ten adjacent record tracks KT. The recording area AA1 is formed by portions of the first five of ten adjacent record tracks KT of each record track group on the side of beginning ends thereof, the recording area AA2 is formed by portions of another five of ten adjacent record tracks KT of each record track group on the side of beginning ends thereof, and the recording area VA is formed by portions of ten adjacent record tracks KT of each record track group other than the portions forming the recording areas AA1 and AA2.

Under the original recording mode, digital video and audio information data are formed respectively by digitalizing video and audio signals constituting a television broadcast signal, and a digital video information data frame section of the digital video information data accompanied with the first attendant data added thereto is recorded on the recording area VA and a digital audio information data section of the digital audio information data accompanied with the second attendant data added thereto, which corresponds to the digital video information data frame section, is recorded on the recording area AA1. Under the after recording mode, after the digital video information data frame section accompanied with the first attendant data added thereto and the digital audio information data section corresponding to that digital video information data frame section and accompanied with the second attendant data added thereto are recorded on the recording areas VA and AA1, respectively, additional digital audio information data formed by digitalizing another audio signal and accompanied with the second attendant data added thereto are recorded on the recording area AA2 in addition to the digital audio information data section having been recorded on the recording area AA1. Under the insert recording mode, after the digital video information data frame section accompanied with the first attendant data added thereto and the digital audio information data section corresponding to that digital video information data frame section and accompanied with the second attendant data added thereto are recorded on the recording areas VA and AA1, respectively, further digital audio information data formed by digitalizing a further audio signal and accompanied with the second attendant data added thereto are recorded on the recording area AA1 in place of the digital audio information data section recorded previously thereon. Further, under the VOS recording mode, digital audio information data formed by digitalizing an audio signal and accompanied with the second attendant data added thereto are recorded on the recording area AA2 prior to the recording of the digital video information data frame section and then the digital video information data frame section accompanied with the first attendant data added thereto and the digital audio information data section corresponding to that digital video information data frame section and accompanied with the second attendant data added thereto are recorded on the recording areas VA and AA2, respectively.

Figure 3:
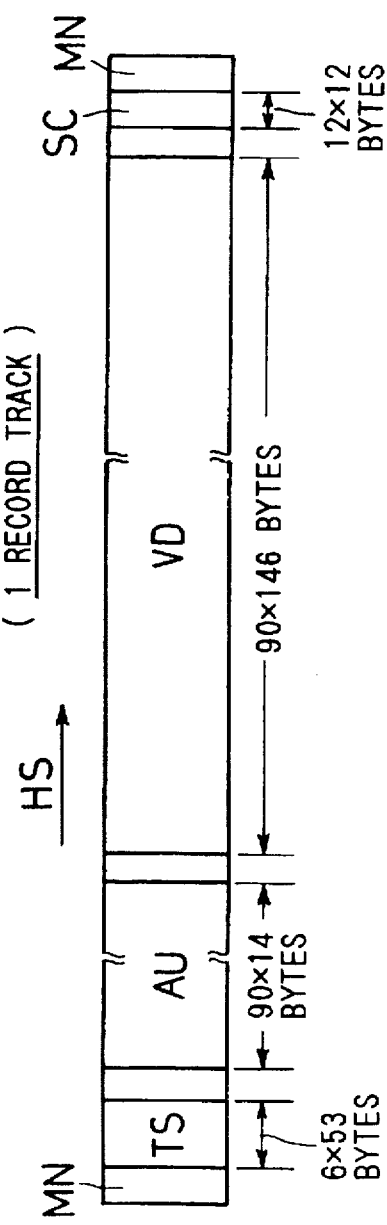

In the recording under any one of the recording modes mentioned above, with the rotary magnetic heads HDA and HDB each moving in the direction indicated by the arrow HS to scan the magnetic tape MT, such data as shown in FIG. 3 are recorded on each record track KT formed on the magnetic tape MT, as follows. First, timing data TS which include 53 synchronous blocks each consisting of 6 bytes are recorded to follow a margin MN at the beginning end of the record track KT and extend over the length of 318 (=53×6) bytes. Then, composite digital audio information data AU which comprise the digital audio information data accompanied with the second attendant data added thereto to include 14 synchronous blocks each consisting of 90 bytes are recorded to follow the timing data TS with a blank lying between and extend over the length of 1,260 (=14×90) bytes and composite digital video information data VD which comprise the digital video information data accompanied with the first attendant data added thereto to include 146 synchronous blocks each consisting of 90 bytes are recorded to follow the composite digital audio information data AU with a blank lying between and extend over the length of 13,140 (=146×90) bytes. Further, composite subcode data SC which include 12 synchronous blocks each consisting of 12 bytes are recorded to follow the composite digital video information data VD with a blank lying between and extend over the length of 144 (=12×12) bytes and a margin MN at the terminal end of the record track KT follows the composite subcode data SC.

Figure 4A:
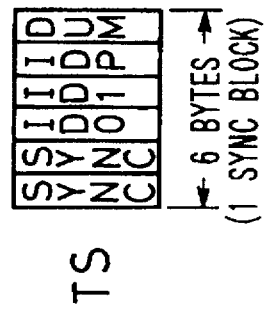
Figure 4B:
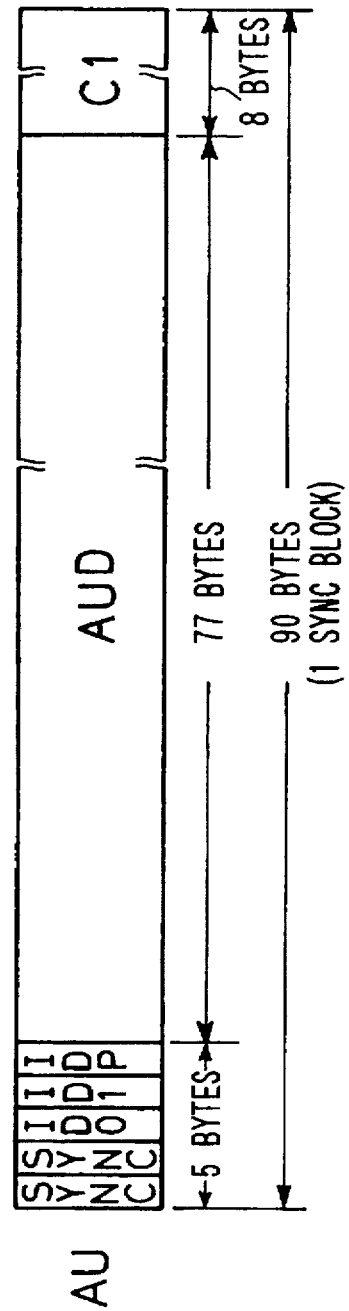
Figure 4C:
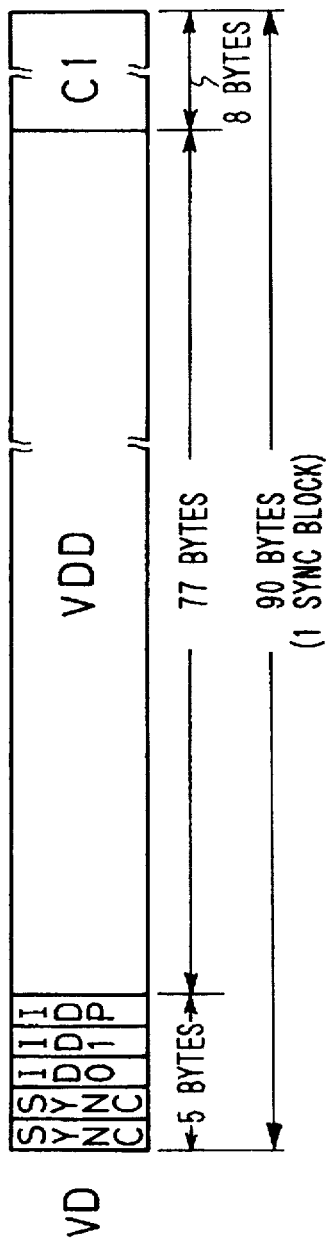
Figure 4D:
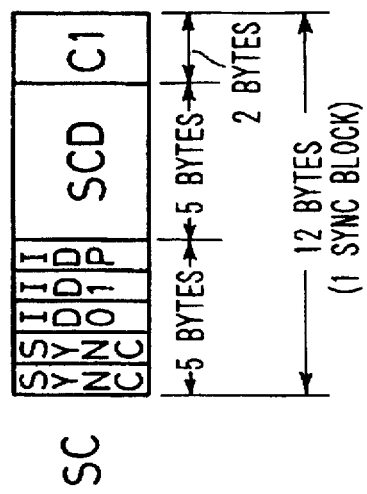

The synchronous block of 6 bytes in the timing data TS comprises, as shown in FIG. 4A, Synchronous data SYNC of 2 bytes, identification data ID0, ID1 and IDP (parity) each consisting of 1 byte, and dummy data DUM of 1 byte. The synchronous block of 90 bytes in the composite digital audio information data AU comprises, as shown in FIG. 4B, synchronous data block of 5 bytes, digital audio information data AUD of 77 bytes including the second attendant data, and error correction code C1 of 8 bytes. The synchronous block of 90 bytes in the composite digital video information data VD comprises, as shown in FIG. 4C, synchronous data block of 5 bytes, digital video information data VDD of 77 bytes including the first attendant data, and error correction code C1 of 8 bytes. The synchronous block of 12 bytes in the composite subcode data SC comprises, as shown in FIG. 4D, synchronous data block of 5 bytes, subcode data SCD of 5 bytes and error correction code C1 of 2 bytes. The synchronous data block of 5 bytes in each of the synchronous block in the composite digital audio information data AU, the synchronous block in the composite digital video information data VD, and the synchronous block in the composite subcode data SC is constituted in common to synchronous data SYNC of 2 bytes and identification data ID0, ID1 and IDP (parity) each consisting of 1 byte.

Figure 5:
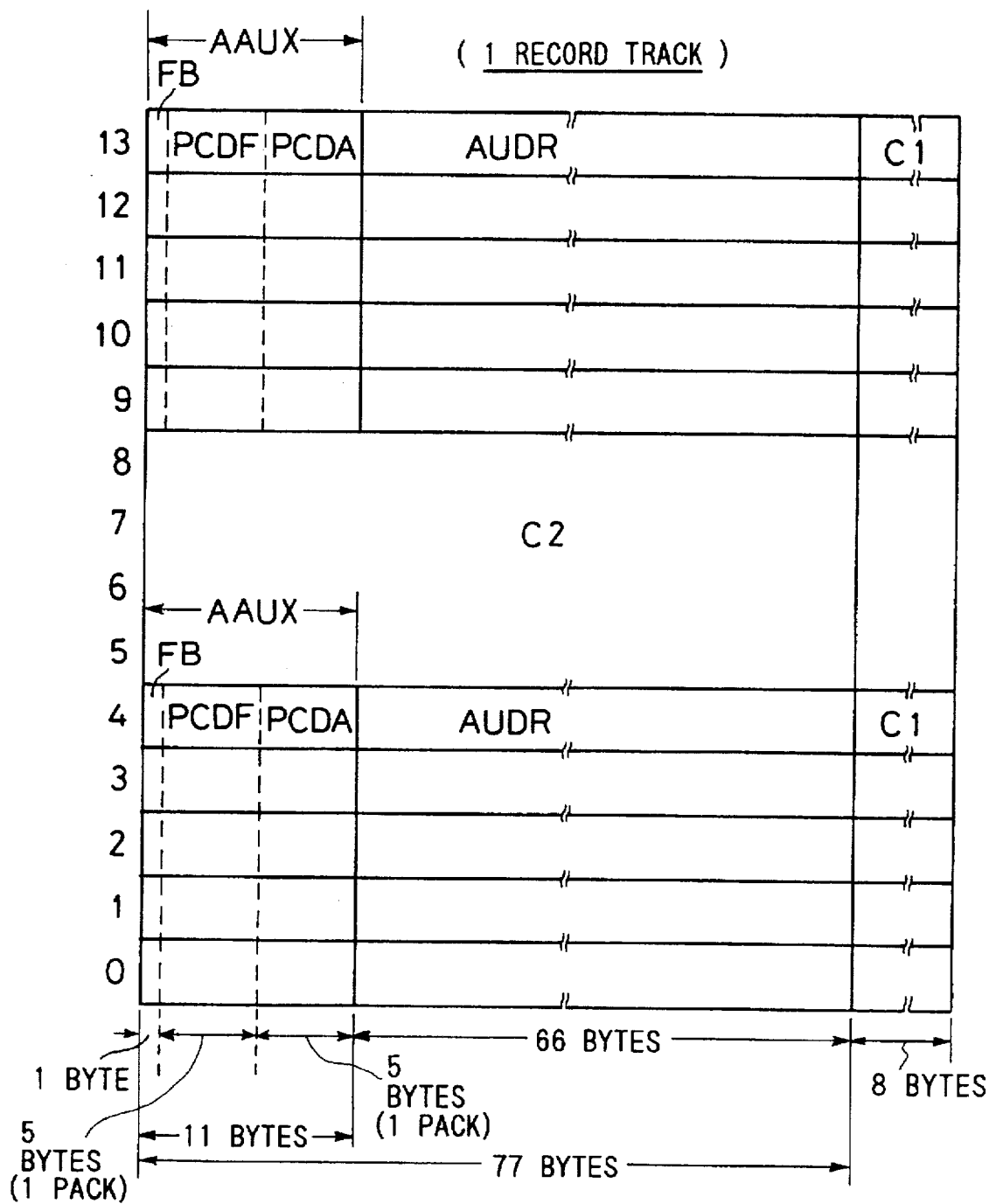

The digital audio information data AUD of 77 bytes including the second attendant data, which are contained in 14 synchronous blocks constituting the composite digital audio information data AU on each record track KT, are arranged in such a manner as shown in FIG. 5. Referring to FIG. 5, the digital audio information data AUD of 77 bytes including the second attendant data and contained in each of 5 synchronous blocks (synchronous block numbers 0 to 4) are linked successively, an error correction code C2 corresponding to 4 synchronous blocks (synchronous block numbers 5 to 8) follows the digital audio information data AUD corresponding to 5 synchronous blocks (synchronous block numbers 0 to 4) and linked successively, and the digital audio information data AUD of 77 bytes including the second attendant data and contained in each of another 5 synchronous blocks (synchronous block numbers 9 to 13) are also linked successively to follow the error correction code C2.

The digital audio information data AUD contained in each of totally 10 synchronous blocks (synchronous block numbers 0 to 4 and 9 to 13) comprise second attendant data AAUX of 11 bytes on the side of the beginning end and the digital audio information data AUDR of 66 bytes following the second attendant data AAUX. Further, the error correction code C1 of 8 bytes follow the digital audio information data AUD of 77 bytes including the second attendant data AAUX and contained in each synchronous block. The second attendant data AAUX of 11 bytes comprise a head byte FB of 1 byte and two data packs PCDF and PCDA each consisting of 5 byte to follow the head byte FB successively.

Figure 6A:
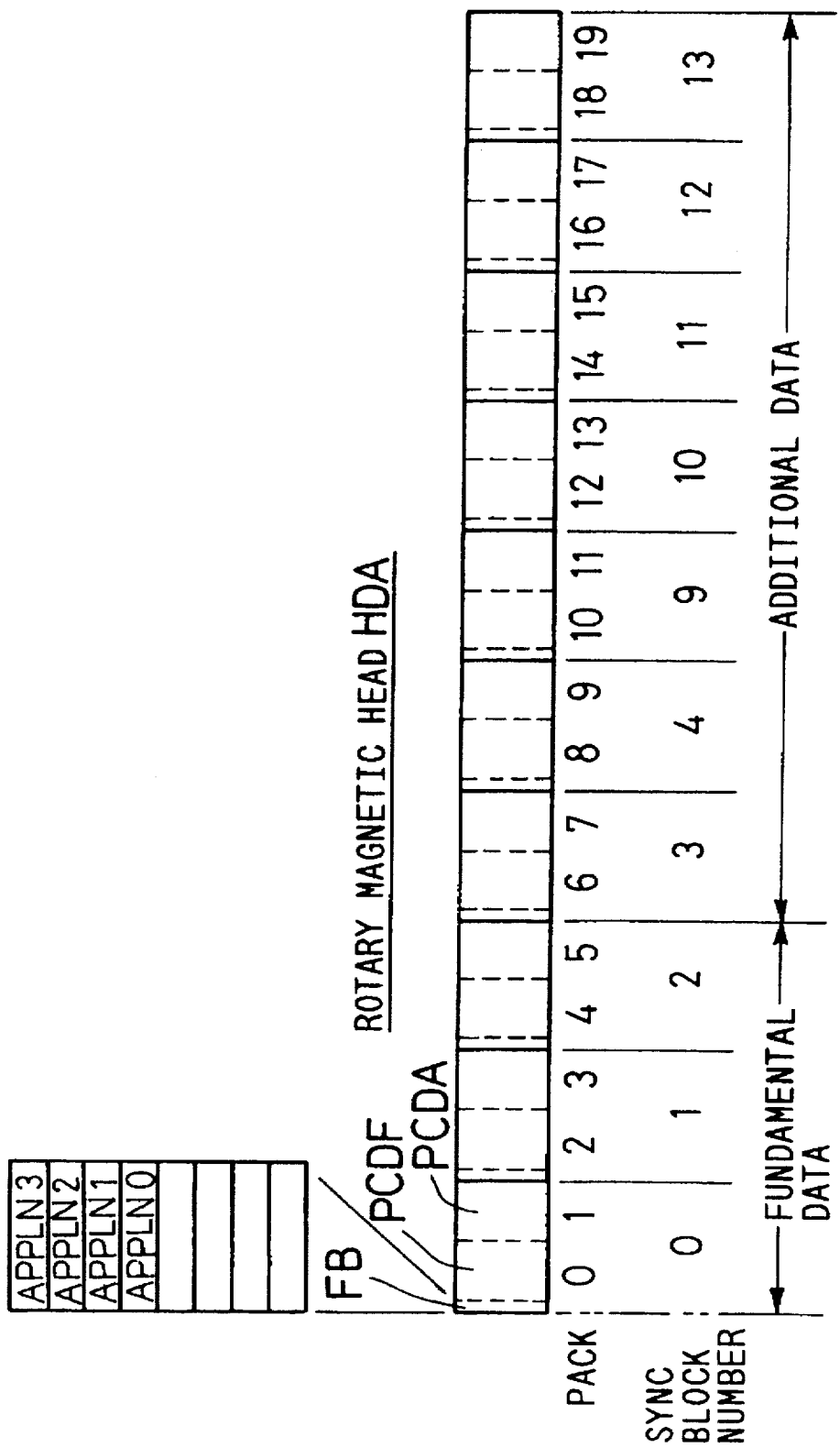
Figure 6B:
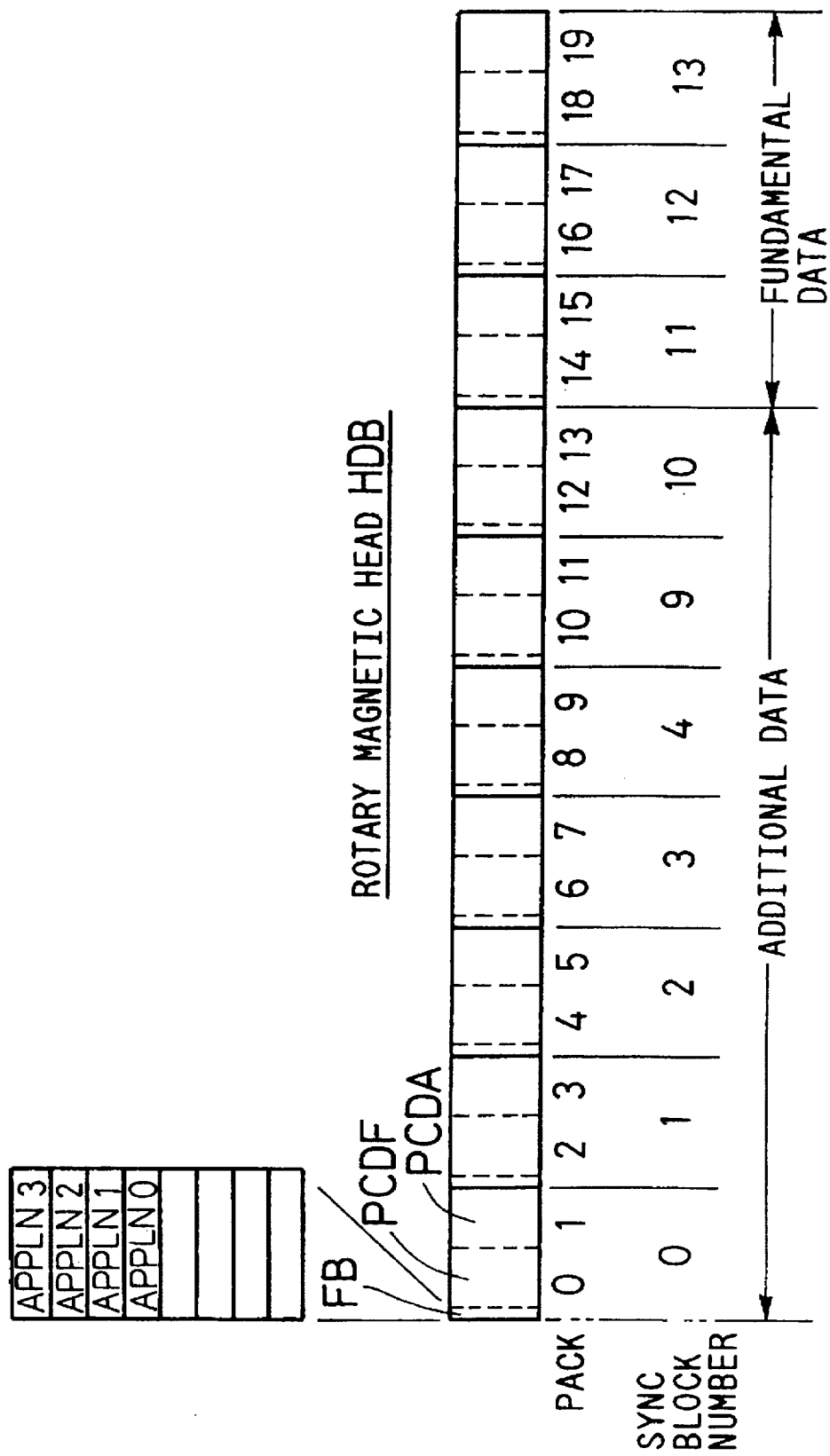

Since the second attendant data AAUX of 11 bytes are contained in each of 10 synchronous blocks (synchronous block numbers 0 to 4 and 9 to 13) on each record track KT, the second attendant data AAUX extracted from each of 10 synchronous blocks can be gathered in such a manner as shown in FIGS. 6A and 6B. FIG. 6A shows a series of the second attendant data AAUX of 11 bytes contained in each of 10 synchronous blocks on the magnetic tape MT which is formed by the rotary magnetic head HDA and this series of the second attendant data AAUX include 10 head bytes FB each containing application data APPLN0 to APPLN3 at 4 bits on the side of the most significant bit (MSB) thereof and 20 data packs PCDF and PCDA (pack 0 to 19) in total. 6 data packs PCDF and PCDA (pack 0 to 5) on the side of the beginning end of the series of the second attendant data AAUX constitute a fundamental data portion and the remaining 14 data packs PCDF and PCDA (pack 6 to 19) constitute an additional data portion. FIG. 6B shows a series of the second attendant data AAUX of 11 bytes contained in each of 10 synchronous blocks on the magnetic tape MT which is formed by the rotary magnetic head HDB and this series of the second attendant data AAUX include 10 head bytes FB each includes application data APPLN0 to APPLN3 at 4 bits on the side of the MSB and 20 data packs PCDF and PCDA (pack 0 to 19) in total. 14 data packs PCDF and PCDA (pack 0 to 13) on the side of the beginning end of the series of 10 second attendant data AAUX constitute an additional data portion and the remaining 6 data packs PCDF and PCDA (pack 14 to 19) constitute a fundamental data portion.

As shown in FIGS. 6A and 6B, the locations of the fundamental and additional portions of the second attendant data AAUX constituted by 20 data packs PCDF and PCDA (pack 0 to 19) are shifted to be replaced with each other between the record tracks KT formed by the rotary magnetic heads HDA and HDB, respectively, and therefore, both of the fundamental and additional portions can be reproduced from the magnetic tape MT even when the magnetic tape MT has received wounds extending to traverse the record tracks KT thereon.

The digital video information data VDD of 77 bytes including the first attendant data, which are contained in 146 synchronous blocks constituting the composite digital video information data VD on each record track KT, are arranged in such a manner that, as shown in FIG. 7, the digital video information data VDD contained in each of 5 synchronous blocks (synchronous block numbers 0 to 4) linked successively constitute as a whole a buffer block BUFB. The digital video information data VDD contained in each of 5 synchronous blocks linked successively and constituting a part of the buffer block BUFB comprise the first attendant data VAUX of 3 bytes on the side of the beginning end and the digital video information data VDDR of 74 bytes following the first attendant data VAUX. Further, the error correction code C1 of 8 bytes follow the digital video information data VDD of 77 bytes including the first attendant data VAUX and contained in each synchronous block.

The first attendant data VAUX of 3 bytes comprise a quantization data QB of 1 byte and data VAX0 and VAX1 each consisting of 1 byte to follow the quantization data QB successively. The data VAX0 and VAX1 are provided for constituting data packs PCDF and PCDA each consisting of 5 bytes as described later. The quantization data QB of 1 byte comprise quantization level number data QNO0 to QNO3 at 4 bits on the side of the least significant bit (LSB) thereof and data (SWP0 to SWP3) for indicating a switching point in quantization level at another 4 bits on the side of the MSB thereof. The data VAX0 and VAX1 contained in each of the first and second synchronous blocks (synchronous block numbers 0 and 1) and the data VAX1 contained in the third synchronous blocks (synchronous block number 2) constitute as a whole the data pack PCDF of 5 bytes, and the data VAX0 contained in the third synchronous blocks (synchronous block number 2) and the data VAX0 and VAX1 contained in each of the fourth and fifth synchronous blocks (synchronous block numbers 3 and 4) constitute as a whole the data pack PCDA of 5 bytes.

Figure 8:
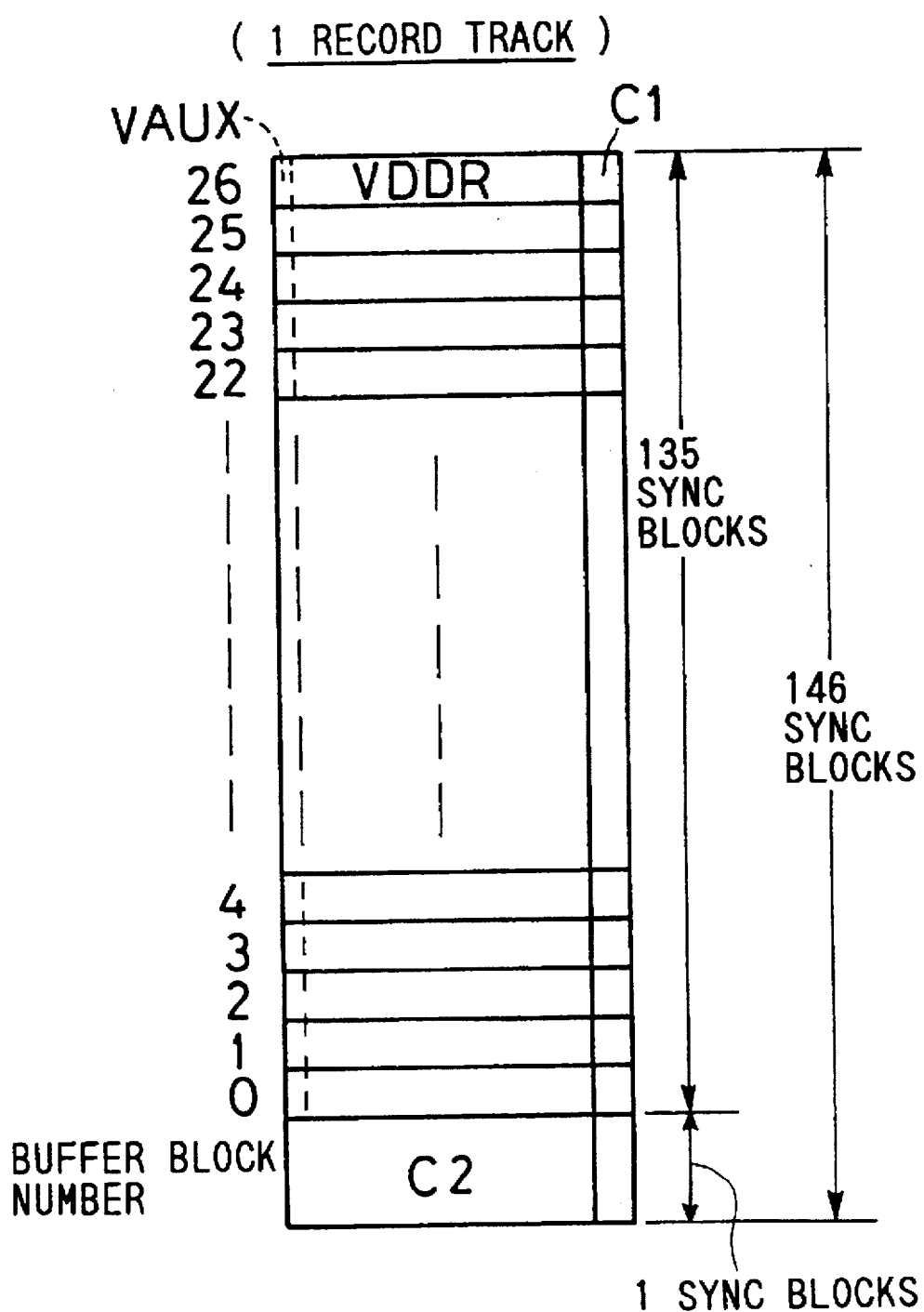

As shown in FIG. 8, 27 buffer blocks BUFB (buffer block numbers 0 to 26) are gathered for corresponding to 135 synchronous blocks and caused to be accompanied with the error correction code corresponding to 11 synchronous blocks so as to form data of 146 synchronous blocks in total. Then, this data of 146 synchronous blocks are recorded on each record track KT as data including 135 synchronous blocks each of which contains the digital video information data of 77 bytes including the first attendant data VAUX.

Figure 9A:
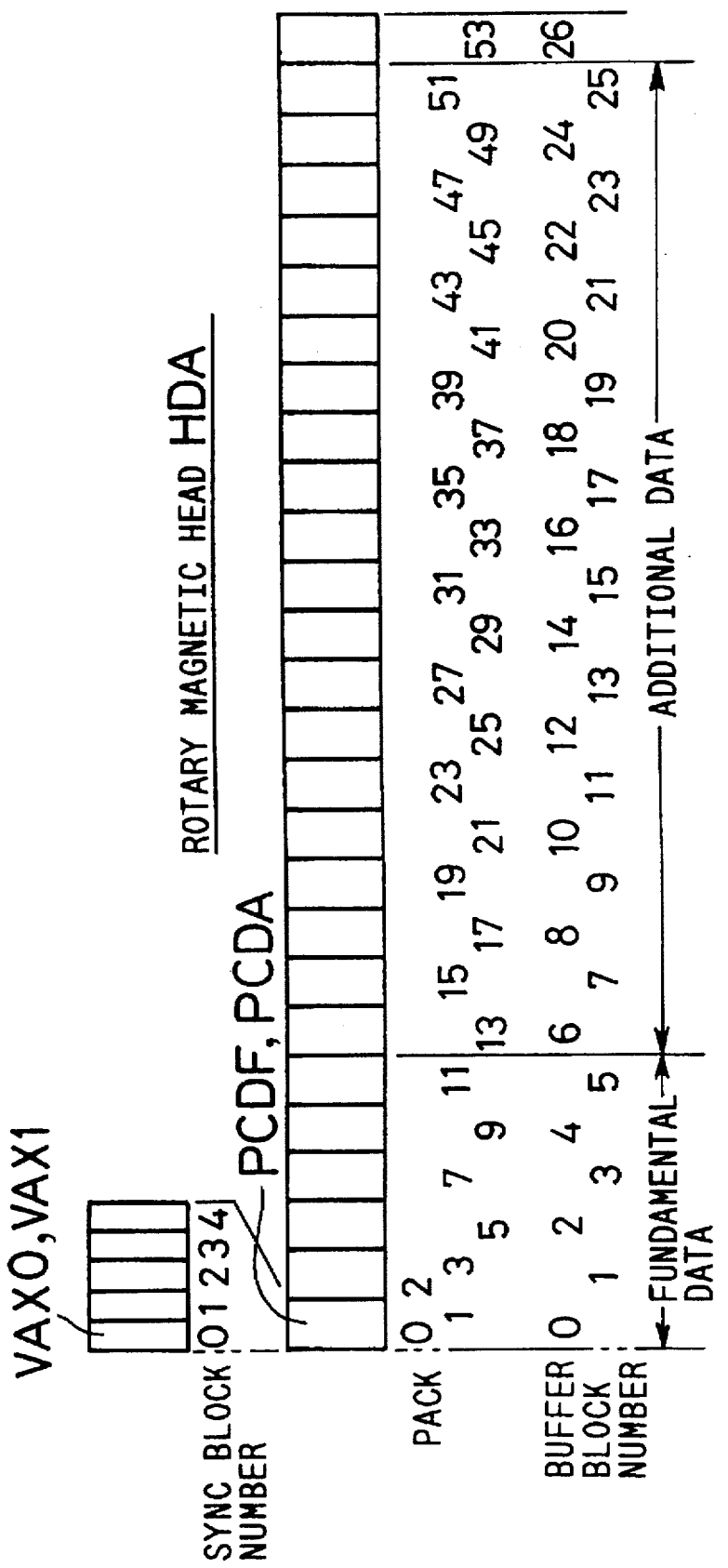
Figure 9B:
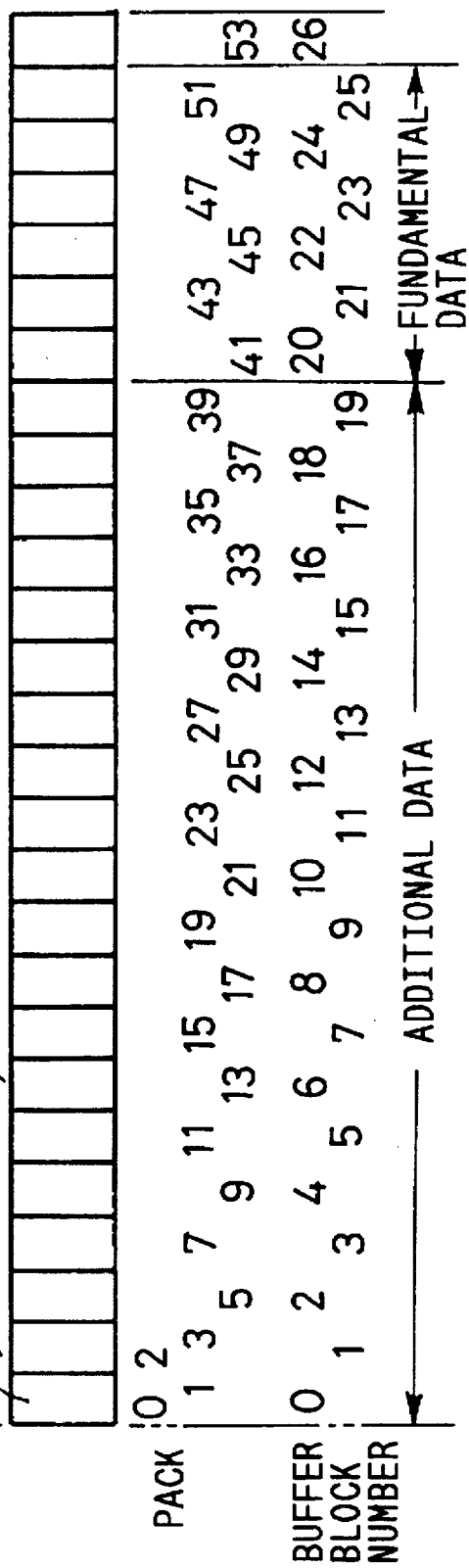

5 pairs of data VAX0 and VAX1 of 2 bytes in the first attendant data VAUX of 3 bytes are contained in each of 27 buffer blocks (buffer block numbers 0 to 26) on each record track KT, and therefore, a pair of pack data PCDF and PCDA constituted by the data VAX0 and VAX1 are contained in each of 27 buffer blocks (buffer block numbers 0 to 26) on each record track KT. Accordingly, the data VAX0 and VAX1 of 2 bytes in the first attendant data VAUX of 3 bytes on each record track KT can be gathered in such a manner as shown in FIGS. 9A and 9B. FIG. 9A shows a series of 135 (=5×27) pairs of data VAX0 and VAX1 on the magnetic tape MT which is formed by the rotary magnetic head HDA and this series of 135 pairs of data VAX0 and VAX1 include 54 data packs PCDF and PCDA (pack 0 to 53). 12 data packs PCDF and PCDA (pack 0 to 11) on the side of the beginning end of the series of 135 pairs of data VAX0 and VAX1 constitute a fundamental data portion and the remaining 40 data packs PCDF and PCDA (pack 12 to 51) constitute an additional data portion. FIG. 9B shows a series of 135 (=5×27) pairs of data VAX0 and VAX1 on the magnetic tape MT which is formed by the rotary magnetic head HDB and this series of 135 pairs of data VAX0 and VAX1 include 54 data packs PCDF and PCDA (pack 0 to 53). 40 data packs PCDF and PCDA (pack 0 to 39) on the side of the beginning end of the series of 135 pairs of data VAX0 and VAX1 constitute a fundamental data portion and the remaining 12 data packs PCDF and PCDA (pack 40 to 51) constitute an additional data portion.

As shown in FIGS. 9A and 9B, the locations of the fundamental and additional portions of the first attendant data VAUX constituted by 54 data packs PCDF and PCDA (pack 0 to 53) are shifted to be replaced with each other between the record tracks KT formed by the rotary magnetic heads HDA and HDB, respectively, and therefore, both of the fundamental and additional portions can be reproduced from the magnetic tape MT even when the magnetic tape MT has received wounds extending to traverse the record tracks KT thereon.

Each of the data packs PCDF and PCDA constituting the first attendant data VAUX or the second attendant data AAUX as described above is composed, as shown in FIG. 10, for example, of data of 5 bytes comprising five kinds of 1 byte (8 bits) data by the word names of PC0, PC1, PC2, PC3 and PC4, respectively. The data by the word name of PC0 are pack header data corresponding to a pack title and each of the data by the word names of PC1, PC2, PC3 and PC4 are pack data having substantial contents. The pack header data PC0 indicate the contents of the pack data PC1, PC2, PC3 and PC4.

Data packs having various kinds of pack titles are prepared as the data packs PCDF and PCDA to include a data pack having its pack title "SOURCE CONT" which represents information of signals to be recorded on the magnetic tape MT. As the data pack having its pack title "SOURCE CONT", a "SOURCE CONT" data pack (hereinafter referred to as a S. P. by abbreviation) constituting the first attendant data VAUX added to the digital video information data VDDR and a S. P. constituting the second attendant data AAUX added to the digital audio information data AUDR are prepared.

The S. P. constituting the first attendant data VAUX is formed, as shown in FIG. 11, to have the pack header data PC0 of a code "0 1 1 0 0 1 0 0" so as to indicate to constitute the first attendant data VAUX. In the S. P. constituting the first attendant data VAUX, the pack data PC1 contain data "DUB GEN" relative to the number of times of dubbing at 4 bits on the side of the LSB thereof, data "DUB SOURCE" relative to the kind of input signals for dubbing (analog input/digital input) at 2 bits higher than the bits for data "DUB GEN", and data "SCMS" for preventing the dubbing at 2 bits on the side of the MSB thereof. The pack data PC2 contain 3 reserve bits on the side of the LSB thereof, data "PHOTO" relative to a still picture at 1 bit higher than the 3 reserve bits, recording mode data "REC MODE" having a code corresponding to one of the original recording mode and the VOS recording mode, 1 reserve bit higher than the bits for the recording mode data "REC MODE", and data "REC ST" relative to a recording start point at the MSB thereof. The pack data PC3 contain data "DISP" relative to a mode of reproduced pictures, an aspect ratio, and so on at 3 bits on the side of the LSB thereof, 3 reserve bits higher than the bits for data "DISP", and data "LINE ID" relative to the existence of line data at 2 bits on the side of the MSB thereof. The pack data PC4 contain 8 reserve bits all over.

The S. P. constituting the second attendant data AAUX is formed, as shown in FIG. 12, to have the pack header data PC0 of a code "0 1 1 1 0 1 0 0" so as to indicate to constitute the second attendant data AAUX. In the S. P. constituting the second attendant data AAUX, the pack data PC1 contain data "DUB GEN" relative to the number of times of dubbing at 4 bits on the side of the LSB thereof, data "DUB SOURCE" relative to the kind of input signals for dubbing (analog input/digital input) at 2 bits higher than the bits for data "DUB GEN", and data "SCMS" for preventing the dubbing at 2 bits on the side of the MSB thereof. The pack data PC2 contain 4 reserve bits on the side of the LSB thereof, recording mode data "REC MODE" having a code corresponding to one of the original recording mode, the after recording mode, the insert recording mode and the VOS recording mode, data "REC END" relative to a recording end point at 1 bit higher than the bits for the recording mode data "REC MODE", and data "REC ST" relative to a recording start point at the MSB thereof. Each of the pack data PC3 and the pack data PC4 contains 8 reserve bits all over.

In the embodiment shown in FIGS. 2A and 2B, under a condition wherein the above described various data are prepared, a mode designating signal SCO from a control signal terminal 11, a mode designating signal SCA from a control signal terminal 12, a mode designating signal SCI from a control signal terminal 13 or a mode designating signal SCV from a control signal terminal 14 is supplied to a recording mode controller 15. The recording mode controller 15 produces, in response to the mode designating signal SCO, SCA, SCI or SCV, a recording mode information signal IM representing the original recording mode, the after recording mode, the insert recording mode or the VOS recording mode and a control signal SS corresponding to the original recording mode, the after recording mode, the insert recording mode or the VOS recording mode.

The recording mode information signal IM obtained from the recording mode controller 15 is supplied to an attendant data generator 16, and the control signal SS obtained from the recording mode controller 15 is supplied to a recording operation controller 18. The recording operation controller 18 produces, in response to the control signal SS, a recording operation control signal SCR for causing a recording portion, which includes the rotary magnetic heads HDA and HDB, a head driving system for rotating the rotary magnetic heads HDA and HDB, a tape driving system for driving and guiding the magnetic tape MT, and so on, to operate under the original recording mode, the after recording mode, the insert recording mode or the VOS recording mode, and forwards the recording operation control signal SCR to the recording portion. Therefore, when the mode designating signal SCO is supplied to the control signal terminal 11, the recording portion is put in the operating condition for the original recording mode, when the mode designating signal SCA is supplied to the control signal terminal 12, the recording portion is put in the operating condition for the after recording mode, when the mode designating signal SCI is supplied to the control signal terminal 13, the recording portion is put in the operating condition for the insert recording mode, and when the mode designating signal SCV is supplied to the control signal terminal 14, the recording portion is put in the operating condition for the VOS recording mode.

The recording portion which operates under the original recording mode, the after recording mode, the insert recording mode or the VOS recording mode produces a head position signal IHP indicating the position on the magnetic tape MT of one of the rotary magnetic heads HDA and HDB which are operative to form the record tracks KT on the magnetic tape MT and a track number signal ITN indicating the number of order of the record track KT which is just formed by one of the rotary magnetic heads HDA and HDB in ten adjacent record tracks KT constituting the record track group to which the subject record track KT belongs. The head position signal IHP and the track number signal ITN obtained from the recording portion are supplied through signal input terminals 19 and 20, respectively, to a recording area detector 21. The recording area detector 21 is operative, based on the head position signal IHP and the track number signal ITN, to detect the recording area AA1, AA2 or VA allocated on the record track group of ten adjacent record tracks KT, as shown in FIG. 1, on which one of the rotary magnetic heads HDA and HDB is positioned to form the record track KT and to produce a recording area detection output signal IA, which represents the recording area AA1, AA2 or VA detected, to be supplied to the attendant data generator 16.

When the mode designating signal SCO is supplied to the control signal terminal 11 and the original recording mode is designated, television broadcast signals SX are supplied through an antenna portion 31 to a tuner 32. In the tuner 32, a tuning operation is carried out, in response to the recording mode information signal IM from the recording mode controller 15 representing the original recording mode, to receive a selected one of the television broadcast signals SX. Then, the television broadcast signal SX thus received is subjected to signal processes including high frequency amplification, frequency conversion, intermediate frequency amplification, video signal detection, audio signal separation, audio signal detection, and so on, and consequently, a video signal SVT and an audio signal SAT are derived from the tuner 32. An information signal IX relative to the television broadcast signal SX received by the tuner 32 is also supplied from the tuner 32 to the attendant data generator 16.

The video signal SVT from the tuner 32 is supplied to an analog to digital (A/D) converter 33 to be digitalized and digital video data VDT based on the video signal SVT are obtained from the analog to digital converter 33. The digital video data VDT are formed into a plurality of data blocks at a data block producing portion 34 for the sake of data compression encoding and block-shaped digital video data VDB are supplied from the data block producing portion 34 to a compression encoder 35. In the compression encoder 35, the block-shaped digital video data VDB are subjected to the data compression encoding to produce digital video information data VDDR. The digital video information data VDDR thus obtained are supplied to a data adder 36. The digital video information data VDDR contain a series of unit video information data blocks each constituting the synchronous block as shown in FIG. 4C. The analog to digital converter 33, the data block producing portion 34 and the compression encoder 35 constitute as a whole a video signal digitalizing portion for producing the digital video information data VDDR based on the video signal SVT.

The audio signal SAT obtained from the tuner 32 is supplied to an audio signal selector 37. In the audio signal selector 37, the audio signal SAT from the tuner 32 is led to an output terminal of the audio signal selector 37 to be supplied to an analog to digital converter 38 in response to the recording mode information signal IM representing the original recording mode, which is supplied from the recording mode controller 15. In the analog to digital converter 38, the audio signal SAT is digitalized to produce digital audio information data AUDR based on the audio signal SAT. The digital audio information data AUDR thus obtained are supplied to a data adder 39. The digital audio information data AUDR contain a series of unit audio information data blocks each constituting the synchronous block as shown in FIG. 4B. The audio signal selector 37 and the analog to digital converter 38 constitute as a whole an audio signal digitalizing portion for producing the digital audio information data AUDR based on the audio signal SAT.

In the attendant data generator 16, in response to the recording mode information signal IM representing the original recording mode from the recording mode controller 15, the recording area detection output signal IA from the recording area detector 21 and the information signal IX from the tuner 32, first attendant data VAUX are produced to contain the data packs PCDF and PCDA and second attendant data AAUX are produced also to contain the data packs PCDF and PCDA. The recording mode data "REC MODE" in the S. P. constituting the first attendant data VAUX are given a code "0 0" when the recording area detection output signal IA indicates that the rotary magnetic head HDA or HDB is on the recording area VA under the situation wherein the recording mode information signal IM represents the original recording mode. The recording mode data "REC MODE" in the S. P. constituting the second attendant data AAUX are given a code "0 0" when the recording area detection output signal IA indicates that the rotary magnetic head HDA or HDB is on the recording area AA1 and a code "1 1" when the recording area detection output signal IA indicates that the rotary magnetic head HDA or HDB is on the recording area AA2 under the situation wherein the recording mode information signal IM represents the original recording mode. The code "1 1" of the recording mode data "REC MODE" indicates that no digital information data are recorded on the magnetic tape MT.

The first attendant data VAUX and the second attendant data AAUX produced by the attendant data generator 16 are supplied to the data adders 36 and 39, respectively. A synchronous data section DTM including synchronous data SYNC and identification data ID0, ID1 and IDP are also supplied to the data adders 36 and 39 from a synchronous data section generator 40. In the data adder 36, composite digital video information data VD are produced by adding the synchronous data section DTM including the synchronous data SYNC and the identification data ID0, ID1 and IDP and the first attendant data VAUX to the digital video information data VDDR to be supplied to a data synthesizer 42. Further, in the data adder 39, composite digital audio information data AU are produced by adding the synchronous data section DTM including the synchronous data SYNC and the identification data ID0, ID1 and IDP and the second attendant data AAUX to the digital audio information data AUDR to be supplied to a data synthesizer 42.

Composite subcode data SC from a subcode data generator 43 and the control signal SS corresponding to the original recording mode from the recording mode controller 15 are also supplied to the data synthesizer 42. In the data synthesizer 42, the composite digital video information data VD, the composite digital audio information data AU and the composite subcode data SC are synthesized with each other at predetermined timings under the control by the control signal SS to produce recording digital information data DRD containing the composite digital video information data VD, the composite digital audio information data AU and the composite subcode data SC.

The recording digital information data DRD obtained from the data synthesizer 42 are subjected to time base adjustment for recording on the magnetic tape MT in a time base adjuster 44 and then supplied to a data shaper 45. Timing data TS from a timing data generator 46 are also supplied to data shaper 45. In the data shaper 45, the timing data TS are further added to the recording digital information data DRD and the recording digital information data DRD accompanied with the timing data TS added thereto are subjected to data shaping for recording on the magnetic tape MT to produce recording digital information data DRC.

The recording digital information data DRC thus obtained from the data shaper 45 are supplied through a recording amplifier 47 to the rotary magnetic head HDA and through a recording amplifier 48 to the rotary magnetic head HDB and recorded on the magnetic tape MT by each of the rotary magnetic heads HDA and HDB. As a result, the timing data TS, the composite digital audio information data AU, the composite digital video information data VD and the composite subcode data SC arranged as shown in FIG. 3 are recorded on each record track KT formed on the magnetic tape MT. In this recording, a section of the composite digital video information data VD which corresponds to one frame period of the video signal SVT and a section of the composite digital audio information data AU which corresponds to the section of the composite digital video information data VD are recorded respectively on the recording areas VA and AA1 allocated on the record track group of ten adjacent record tracks KT formed on the magnetic tape MT, as shown in FIG. 1.

When the mode designating signal SCA is supplied to the control signal terminal 12 and the after recording mode is designated, an external audio signal SAA is supplied through an external audio signal terminal 50 to the audio signal selector 37. In this case, the recording mode information signal IM representing the after recording mode is supplied to the audio signal selector 37 from the recording mode controller 15. In the audio signal selector 37, the external audio signal SAA is led to the output terminal of the audio signal selector 37 to be supplied to the analog to digital converter 38 in response to the recording mode information signal IM representing the after recording mode. In the analog to digital converter 38, the external audio signal SAA is digitalized to produce digital audio information data AUDR based on the external audio signal SAA. The digital audio information data AUDR thus obtained are supplied to the data adder 39. The audio signal selector 37 and the analog to digital converter 38 constitute as a whole an audio signal digitalizing portion for producing the digital audio information data AUDR based on the external audio signal SAA.

In the attendant data generator 16, in response to the recording mode information signal IM representing the after recording mode from the recording mode controller 15 and the recording area detection output signal IA from the recording area detector 21, second attendant data AAUX are produced to contain the data packs PCDF and PCDA. The recording mode data "REC MODE" in the S. P. constituting the second attendant data AAUX are given a code "0 1" when the recording area detection output signal IA indicates that the rotary magnetic head HDA or HDB is on the recording area AA2 under the situation wherein the recording mode information signal IM represent the after recording mode.

The second attendant data AAUX produced by the attendant data generator 16 are supplied to the data adders 39. The synchronous data section DTM including synchronous data SYNC and identification data ID0, ID1 and IDP are also supplied to the data adder 39 from the synchronous data section generator 40. In the data adder 39, composite digital audio information data AU are produced by adding the synchronous data section DTM including the synchronous data SYNC and the identification data ID0, ID1 and IDP and the second attendant data AAUX to the digital audio information data AUDR to be supplied to the data synthesizer 42.

The composite subcode data SC from the subcode data generator 43 and the control signal SS corresponding to the after recording mode from the recording mode controller 15 are also supplied to the data synthesizer 42. In the data synthesizer 42, the composite digital audio information data AU and the composite subcode data SC are synthesized with each other at predetermined timings under the control by the control signal SS to produce recording digital information data DRD containing the composite digital audio information data AU and the composite subcode data SC.

The recording digital information data DRD obtained from the data synthesizer 42 are subjected to time base adjustment for recording on the magnetic tape MT in the time base adjuster 44 and then supplied to the data shaper 45. The timing data TS from the timing data generator 46 are also supplied to data shaper 45. In the data shaper 45, the timing data TS are further added to the recording digital information data DRD and the recording digital information data DRD accompanied with the timing data TS added thereto are subjected to data shaping for recording on the magnetic tape MT to produce recording digital information data DRC.

The recording digital information data DRC thus obtained from the data shaper 45 are supplied through the recording amplifier 47 to the rotary magnetic head HDA and through the recording amplifier 48 to the rotary magnetic head HDB and recorded on the magnetic tape MT by each of the rotary magnetic heads HDA and HDB. As a result, the composite digital audio information data AU are recorded on the recording area AA2 allocated on the record track group of ten adjacent record tracks KT formed on the magnetic tape MT, as shown in FIG. 1, in addition to the section of the composite digital audio information data AU recorded on the recording area AA1 allocated also on the record track group of ten adjacent record tracks KT formed on the magnetic tape MT.

When the mode designating signal SCI is supplied to the control signal terminal 13 and the insert recording mode is designated, an external audio signal SAA is supplied through an external audio signal terminal 50 to the audio signal selector 37. In this case, the recording mode information signal IM representing the insert recording mode is supplied to the audio signal selector 37 from the recording mode controller 15. In the audio signal selector 37, the external audio signal SAA is led to the output terminal of the audio signal selector 37 to be supplied to the analog to digital converter 38 in response to the recording mode information signal IM representing the after recording mode. In the analog to digital converter 38, the external audio signal SAA is digitalized to produce digital audio information data AUDR based on the external audio signal SAA. The digital audio information data AUDR thus obtained are supplied to the data adder 39.

In the attendant data generator 16, in response to the recording mode information signal IM representing the insert recording mode from the recording mode controller 15 and the recording area detection output signal IA from the recording area detector 21, second attendant data AAUX are produced to contain the data packs PCDF and PCDA. The recording mode data "REC MODE" in the S. P. constituting the second attendant data AAUX are given a code "1 0" when the recording area detection output signal IA indicates that the rotary magnetic head HDA or HDB is on the recording area AA1 under the situation wherein the recording mode information signal IM represent the insert recording mode.

The second attendant data AAUX produced by the attendant data generator 16 are supplied to the data adders 39. The synchronous data section DTM including synchronous data SYNC and identification data ID0, ID1 and IDP are also supplied to the data adder 39 from the synchronous data section generator 40. In the data adder 39, composite digital audio information data AU are produced by adding the synchronous data section DTM including the synchronous data SYNC and the identification data ID0, ID1 and IDP and the second attendant data AAUX to the digital audio information data AUDR to be supplied to the data synthesizer 42.

The composite subcode data SC from the subcode data generator 43 and the control signal SS corresponding to the insert recording mode from the recording mode controller 15 are also supplied to the data synthesizer 42. In the data synthesizer 42, the composite digital audio information data AU and the composite subcode data SC are synthesized with each other at predetermined timings under the control by the control signal SS to produce recording digital information data DRD containing the composite digital audio information data AU and the composite subcode data SC.

The recording digital information data DRD obtained from the data synthesizer 42 are subjected to time base adjustment for recording on the magnetic tape MT in the time base adjuster 44 and then supplied to the data shaper 45. The timing data TS from the timing data generator 46 are also supplied to data shaper 45. In the data shaper 45, the timing data TS are further added to the recording digital information data DRD and the recording digital information data DRD accompanied with the timing data TS added thereto are subjected to data shaping for recording on the magnetic tape MT to produce recording digital information data DRC.

The recording digital information data DRC thus obtained from the data shaper 45 are supplied through the recording amplifier 47 to the rotary magnetic head HDA and through the recording amplifier 48 to the rotary magnetic head HDB and recorded on the magnetic tape MT by each of the rotary magnetic heads HDA and HDB. As a result, the composite digital audio information data AU are recorded on the recording area AA1 allocated on the record track group of ten adjacent record tracks KT formed on the magnetic tape MT, as shown in FIG. 1, in place of the the section of the composite digital audio information data AU recorded previously thereon.

When the mode designating signal SCV is supplied to the control signal terminal 14 and the VOS recording models designated, an external audio signal SAA is supplied through an external audio signal terminal 50 to the audio signal selector 37. In this case, the recording mode information signal IM representing the VOS recording mode is supplied to the audio signal selector 37 from the recording mode controller 15. In the audio signal selector 37, the external audio signal SAA is led to the output terminal of the audio signal selector 37 to be supplied to the analog to digital converter 38 in response to the recording mode information signal IM representing the VOS recording mode. In the analog to digital converter 38, the external audio signal SAA is digitalized to produce digital audio information data AUDR based on the external audio signal SAA. The digital audio information data AUDR thus obtained are supplied to the data adder 39.

In the attendant data generator 16, in response to the recording mode information signal IM representing the VOS recording mode from the recording mode controller 15 and the recording area detection output signal IA from the recording area detector 21, first attendant data VAUX are produced to contain the data packs PCDF and PCDA and second attendant data AAUX are produced also to contain the data packs PCDF and PCDA. The recording mode data "REC MODE" in the S. P. constituting the first attendant data VAUX are given a code "1 1" when the recording area detection output signal IA indicates that the rotary magnetic head HDA or HDB is on the recording area VA under the situation wherein the recording mode information signal IM represent the VOS recording mode. The recording mode data "REC MODE" in the S. P. constituting the second attendant data AAUX are given a code "1 1" when the recording area detection output signal IA indicates that the rotary magnetic head HDA or HDB is on the recording area AA1 and a code "0 1" when the recording area detection output signal IA indicates that the rotary magnetic head HDA or HDB is on the recording area AA2 under the situation wherein the recording mode information signal IM represent the VOS recording mode. The code "1 1" of the recording mode data "REC MODE" indicates that no digital information data are recorded on the magnetic tape MT.

The first attendant data VAUX and the second attendant data AAUX produced by the attendant data generator 16 are supplied to the data adders 36 and 39, respectively. A synchronous data section DTM including synchronous data SYNC and identification data ID0, ID1 and IDP are also supplied to the data adders 36 and 39 from a synchronous data section generator 40. In the data adder 36, composite digital video information data VD comprising the synchronous data section DTM including the synchronous data SYNC and the identification data ID0, ID1 and IDP and the first attendant data VAUX are produced to be supplied to the data synthesizer 42. Further, in the data adder 39, composite digital audio information data AU are produced by adding the synchronous data section DTM including the synchronous data SYNC and the identification data ID0, ID1 and IDP and the second attendant data AAUX to the digital audio information data AUDR to be supplied to a data synthesizer 42.

Composite subcode data SC from a subcode data generator 43 and the control signal SS corresponding to the original recording mode from the recording mode controller 15 are also supplied to the data synthesizer 42. In the data synthesizer 42, the composite digital video information data VD, the composite digital audio information data AU and the composite subcode data SC are synthesized with each other at predetermined timings under the control by the control signal SS to produce recording digital information data DRD containing the composite digital video information data VD, the composite digital audio information data AU and the composite subcode data SC.

The recording digital information data DRD obtained from the data synthesizer 42 are subjected to time base adjustment for recording on the magnetic tape MT in a time base adjuster 44 and then supplied to a data shaper 45. Timing data TS from a timing data generator 46 are also supplied to data shaper 45. In the data shaper 45, the timing data TS are further added to the recording digital information data DRD and the recording digital information data DRD accompanied with the timing data TS added thereto are subjected to data shaping for recording on the magnetic tape MT to produce recording digital information data DRC.

The recording digital information data DRC thus obtained from the data shaper 45 are supplied through a recording amplifier 47 to the rotary magnetic head HDA and through a recording amplifier 48 to the rotary magnetic head HDB and recorded on the magnetic tape MT by each of the rotary magnetic heads HDA and HDB. As a result, the synchronous data section DTM including the synchronous data SYNC and the identification data ID0, ID1 and IDP and the first attendant data VAUX, the synchronous data section DTM including the synchronous data SYNC and the second attendant data AAUX, and the composite digital audio information data AU are recorded respectively on the recording areas VA, AA1 and AA2 allocated on the record track group of ten adjacent record tracks KT formed on the magnetic tape MT, as shown in FIG. 1.

The data synthesizer 42, the time base adjuster 44 and the data shaper 45 constitute a recording data generating portion for producing the recording digital information data DRC including at least one of the digital video information data VDDR accompanied with the first attendant data VAUX added thereto (=VDD) and the digital audio information data AUDR accompanied with the second attendant data AAUX added thereto (=AUD).

In the embodiment shown in FIGS. 2A and 2B and described above, the attendant data generator 16 for producing the first and second attendant data VAUX and AAUX is constituted by, for example, a microcomputer. One example of an operation program carried out by the microcomputer constituting the attendant data generator 16 for determining the code of the recording mode data "REC MODE" in the S. P. constituting the first attendant data VAUX and the code of the recording mode data "REC MODE" in the S. P. constituting the second attendant data AAUX, will be explained below with reference to a flow chart shown in FIGS. 13A and 13B.

Figure 13A:
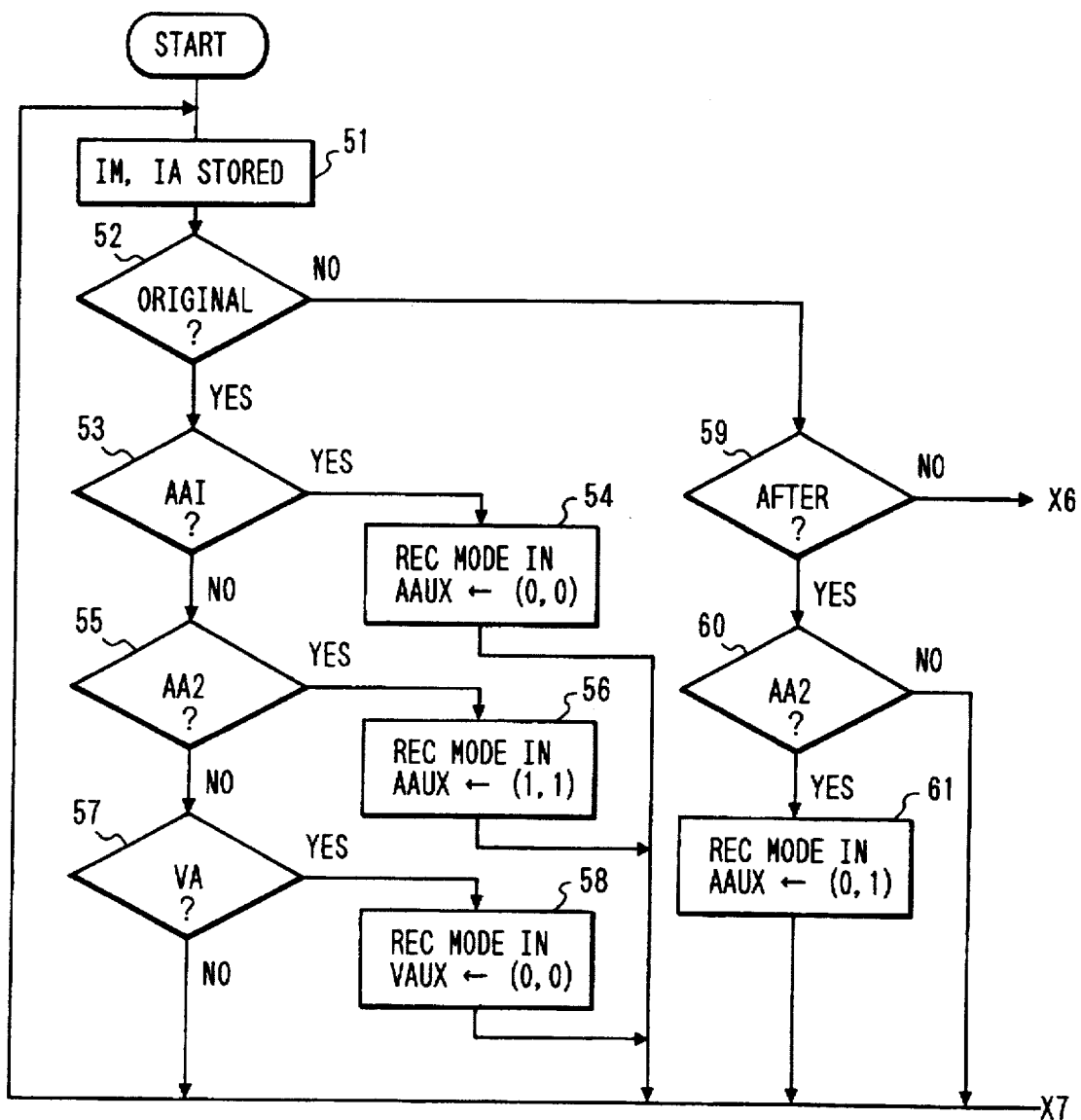
FIGS. 13A and 13B are flow charts used for explaining a control program for setting a code of a recording mode data carried out by a microcomputer which constitutes an attendant data generating portion in each of the embodiments shown in FIGS. 1.
Figure 13B:
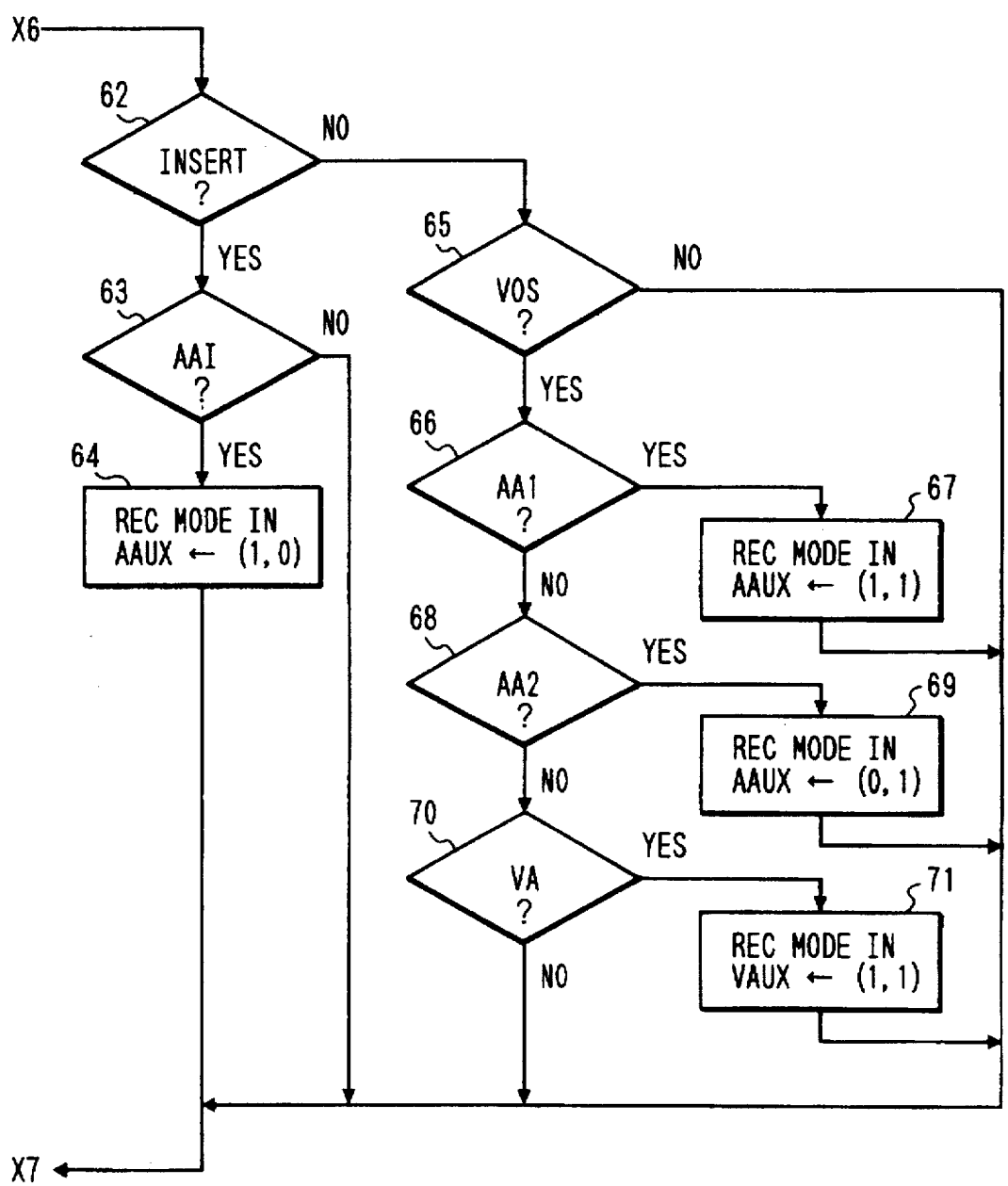

Referring to the flow chart shown in FIGS. 13A and 13B, first, in step 51, the recording mode information signal IM and the recording area detection output signal IA are stored. Then, in step 52, it is checked based on the recording mode information signal IM whether the original recording mode is designated or not. If the original recording mode is designated, it is checked based on the recording area detection output signal IA whether the rotary magnetic head HDA or HDB is on the recording area AA1 or not, in step 53. As a result, if the rotary magnetic head HDA or HDB is on the recording area AA1, the code of the recording mode data "REC MODE" in the S. P. constituting the second attendant data AAUX is set to be "0 0", in step 54, and the process returns to the step 51.

If it is clarified in the step 53 that the rotary magnetic head HDA or HDB is not on the recording area AA1, it is checked based on the recording area detection output signal IA whether the rotary magnetic head HDA or HDB is on the recording area AA2 or not, in step 55. As a result, if the rotary magnetic head HDA or HDB is on the recording area AA2, the code of the recording mode data "REC MODE" in the S. P. constituting the second attendant data AAUX is set to be "1 1", in step 56, and the process returns to the step 51. Further, if it is clarified in the step 55 that the rotary magnetic head HDA or HDB is not on the recording area AA2, it is checked based on the recording area detection output signal IA whether the rotary magnetic head HDA or HDB is on the recording area VA or not, in step 57. As a result, if the rotary magnetic head HDA or HDB is on the recording area VA, the code of the recording mode data "REC MODE" in the S. P. constituting the first attendant data VAUX is set to be "0 0", in step 58, and the process returns to the step 51. To the contrary, if the rotary magnetic head HDA or HDB is not on the recording area VA, the process returns to the step 51 directly from the step 57.

If it is clarified in the step 52 that original recording mode is not designated, it is checked based on the recording mode information signal IM whether the after recording mode is designated or not, in step 59. If the after recording mode is designated, it is checked based on the recording area detection output signal IA whether the rotary magnetic head HDA or HDB is on the recording area AA2 or not, in step 60. If the rotary magnetic head HDA or HDB is on the recording area AA2, the code of the recording mode data "REC MODE" in the S. P. constituting the second attendant data AAUX is set to be "0 1", in step 61, and the process returns to the step 51. To the contrary, if the rotary magnetic head HDA or HDB is not on the recording area AA2, the process returns to the step 51 directly from the step 60.

As a result of the check in the step 59, if the after recording mode is not designated, it is checked based on the recording mode information signal IM whether the insert recording mode is designated or not, in step 62. If the insert recording mode is designated, it is checked based on the recording area detection output signal IA whether the rotary magnetic head HDA or HDB is on the recording area AA1 or not, in step 63. If the rotary magnetic head HDA or HDB is on the recording area AA1, the code of the recording mode data "REC MODE" in the S. P. constituting the second attendant data AAUX is set to be "1 0", in step 64, and the process returns to the step 51. On the other hand, if the rotary magnetic head HDA or HDB is not on the recording area AA1, the process returns to the step 51 directly from the step 63.

Further, if it is clarified in the step 62 that insert recording mode is not designated, it is checked based on the recording mode information signal IM whether the VOS recording mode is designated or not, in step 65. If the VOS recording mode is designated, it is checked based on the recording area detection output signal IA whether the rotary magnetic head HDA or HDB is on the recording area AA1 or not, in step 66. As a result, if the rotary magnetic head HDA or HDB is on the recording area AA1, the code of the recording mode data "REC MODE" in the S. P. constituting the second attendant data AAUX is set to be "1 1", in step 67, and the process returns to the step 51.

If it is clarified in the step 66 that the rotary magnetic head HDA or HDB is not on the recording area AA1, it is checked based on the recording area detection output signal IA whether the rotary magnetic head HDA or HDB is on the recording area AA2 or not, in step 68. As a result, if the rotary magnetic head HDA or HDB is on the recording area AA2, the code of the recording mode data "REC MODE" in the S. P. constituting the second attendant data AAUX is set to be "0 1", in step 69, and the process returns to the step 51. Further, if it is clarified in the step 68 that the rotary magnetic head HDA or HDB is not on the recording area AA2, it is checked based on the recording area detection output signal IA whether the rotary magnetic head HDA or HDB is on the recording area VA or not, in step 70. As a result, if the rotary magnetic head HDA or HDB is on the recording area VA, the code of the recording mode data "REC MODE" in the S. P. constituting the first attendant data VAUX is set to be "1 1", in step 71, and the process returns to the step 51. On the other hand, if the rotary magnetic head HDA or HDB is not on the recording area VA, the process returns to the step 51 directly from the step 70.

Finally, if it is clarified in the step 65 that the VOS recording mode is not designated, the process returns to the step 51 directly from the step 65.

Figure 14:
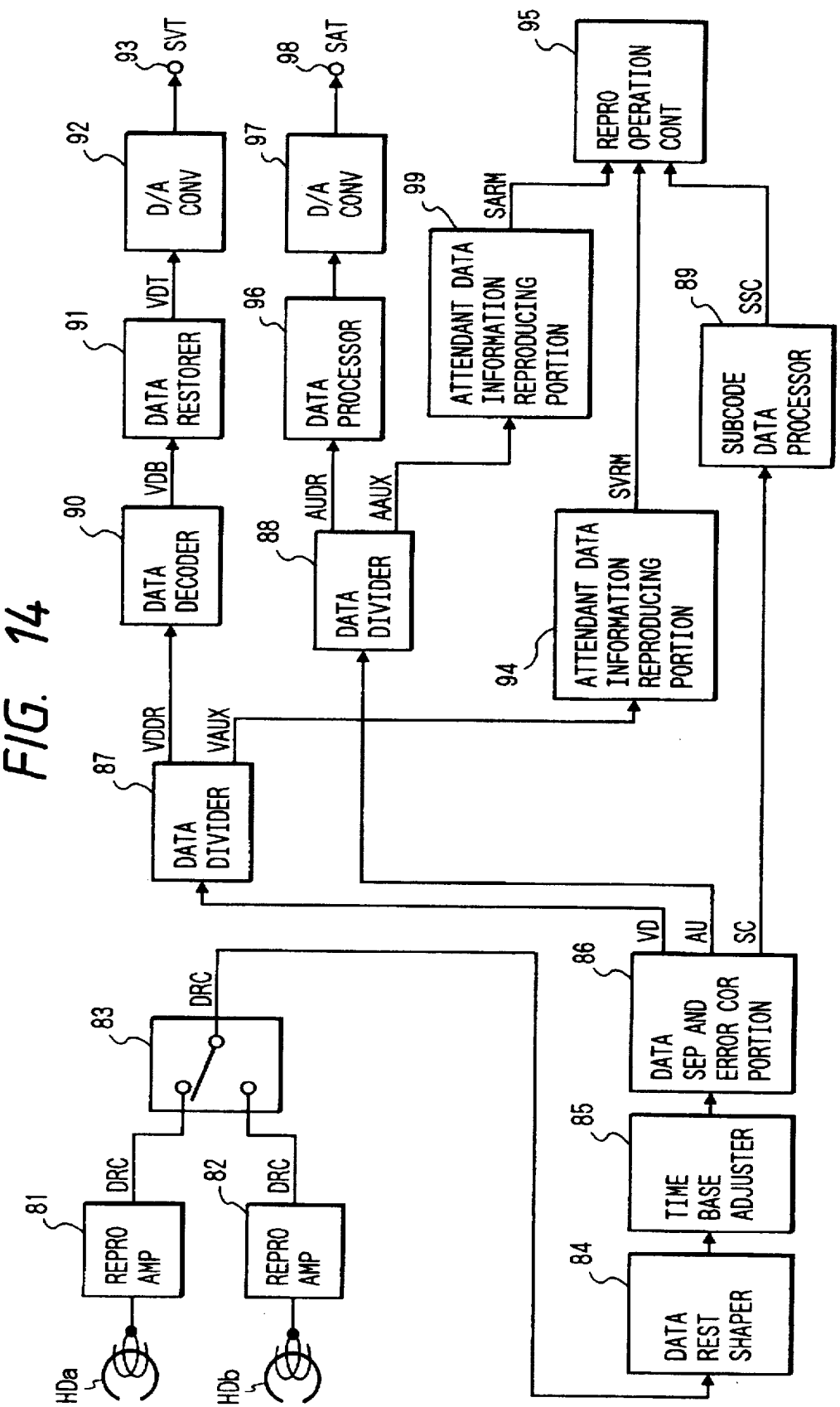
FIG. 14 is a block diagram showing one embodiment of apparatus for reproducing digital information according to the present invention.

FIG. 14 shows an embodiment of apparatus for reproducing digital information according to the present invention.

Referring to FIG. 14, a pair of rotary magnetic heads HDa and HDb are provided, and recording digital information data which contain digital video data formed based on a video signal and accompanied with a first attendant data added thereto and digital audio data formed based on an audio signal and accompanied with a second attendant data added thereto are reproduced from a magnetic tape by the rotary magnetic heads HDa and HDb. On the magnetic tape used for the reproduction by the embodiment shown in FIG. 14, record tracks are formed in the same manner as the record tracks KT on the magnetic tape MT shown in FIG. 1, and timing data TS, composite digital audio information data AU, composite digital video information data VD and composite subcode data SC arranged in such a manner as shown in FIG. 3 are recorded on each record track KT.

In the embodiment shown in FIG. 14, recording digital information data DRC reproduced by the rotary magnetic heads HDa and HDb alternately from each record track on the magnetic tape are supplied through reproducing amplifiers 81 and 82 to a switch 83. The switch 83 is operative to extract continuously the recording digital information data DRC which are obtained alternately from the rotary magnetic heads HDa and HDb to be supplied to a data restoration shaper 84. In the data restoration shaper 84, the recording digital information data DRC are subjected to data restoration shaping for cancelling the data shaping provided on the occasion of recording on the magnetic tape.

The recording digital information data DRC obtained from the data restoration shaper 84 are further subjected to time base adjustment for reproducing process in a time base adjuster 85 and then supplied to a data separating and error correcting portion 86. In the data separating and error correcting portion 86, composite digital video information data VD, composite digital audio information data AU, and composite subcode data SC are separated from the recording digital information data DRC and then subjected to their respective error corrections. The composite digital video information data VD having been subjected to the error correction, the composite digital audio information data AU having been subjected to the error correction, and the composite subcode data SC having been subjected to the error correction are supplied to a data divider 87, a data divider 88 and a subcode data processor 89, respectively.

In the data divider 87, the composite digital video information data VD are divided into digital video information data VDDR and first attendant data VAUX. The digital video information data VDDR obtained from the data divider 87 are supplied to a data decoder 90 to be decoded therein to produce block-shaped digital video data VDB. The block-shaped digital video data VDB obtained from the data decoder 90 are restored in a data restorer 91 to be digital video data VDT. The digital video data VDT obtained from the data restorer 91 are supplied to a digital to analog (D/A) converter 92 to be converted to a video signal SVT. The video signal SVT thus reproduced is derived from a video signal output terminal 93.

The first attendant data VAUX obtained from the data divider 87 are supplied to an attendant data information reproducing portion 94. In the attendant data information reproducing portion 94, various kinds of information represented by the first attendant data VAUX are reproduced and, for example, a recording mode detection output signal SVRM which represents the reproduced information relative to the code of the recording mode data "REC MODE" in the S. P. constituting the first attendant data VAUX is obtained from the attendant data information reproducing portion 94 and supplied to a reproducing operation controller 95.

In the data divider 88, the composite digital audio information data AU are divided into digital audio information data AUDR and second attendant data AAUX. The digital audio information data AUDR obtained from the data divider 88 are supplied to a data processor 96 to be subjected to predetermined data processings. Then, the digital audio information data AUDR from the data processor 96 are supplied to a digital to analog converter 97 to be converted to an audio signal SAT. The audio signal SAT thus reproduced is derived from an audio signal output terminal 98.

The second attendant data AAUX obtained from the data divider 88 are supplied to an attendant data information reproducing portion 99. In the attendant data information reproducing portion 99, various kinds of information represented by the second attendant data AAUX are reproduced and, for example, a recording mode detection output signal SARM which represents the reproduced information relative to the code of the recording mode data "REC MODE" in the S. P. constituting the second attendant data AAUX is obtained from the attendant data information reproducing portion 99 and supplied to the reproducing operation controller 95.

In the reproducing operation controller 95 to which the recording mode detection output signals SVRM and SARM are supplied, the recording mode through which the composite digital audio information data AU have been recorded on the magnetic tape can be easily detected on the strength of the recording mode detection output signals SVRM and SARM.

Further, in the subcode data processor 89 to which the composite subcode data SC obtained from the data separating and error correcting portion 86, the composite subcode data SC are subjected to various data processings and, for example, a detection output signal SSC which corresponds to the code of the composite subcode data SC is obtained to be supplied to the reproducing operation controller 95.

An embodiment of apparatus for recording and reproducing digital information according to the present invention comprises the apparatus for recording digital information shown in FIGS. 2A and 2B and the apparatus for reproducing digital information shown in FIG. 14 which can be combined with each other so as to have, for example, the rotary magnetic heads HDA and HDB used for both recording and reproducing without using the rotary magnetic heads HDa and HDb.

Figure 15A:
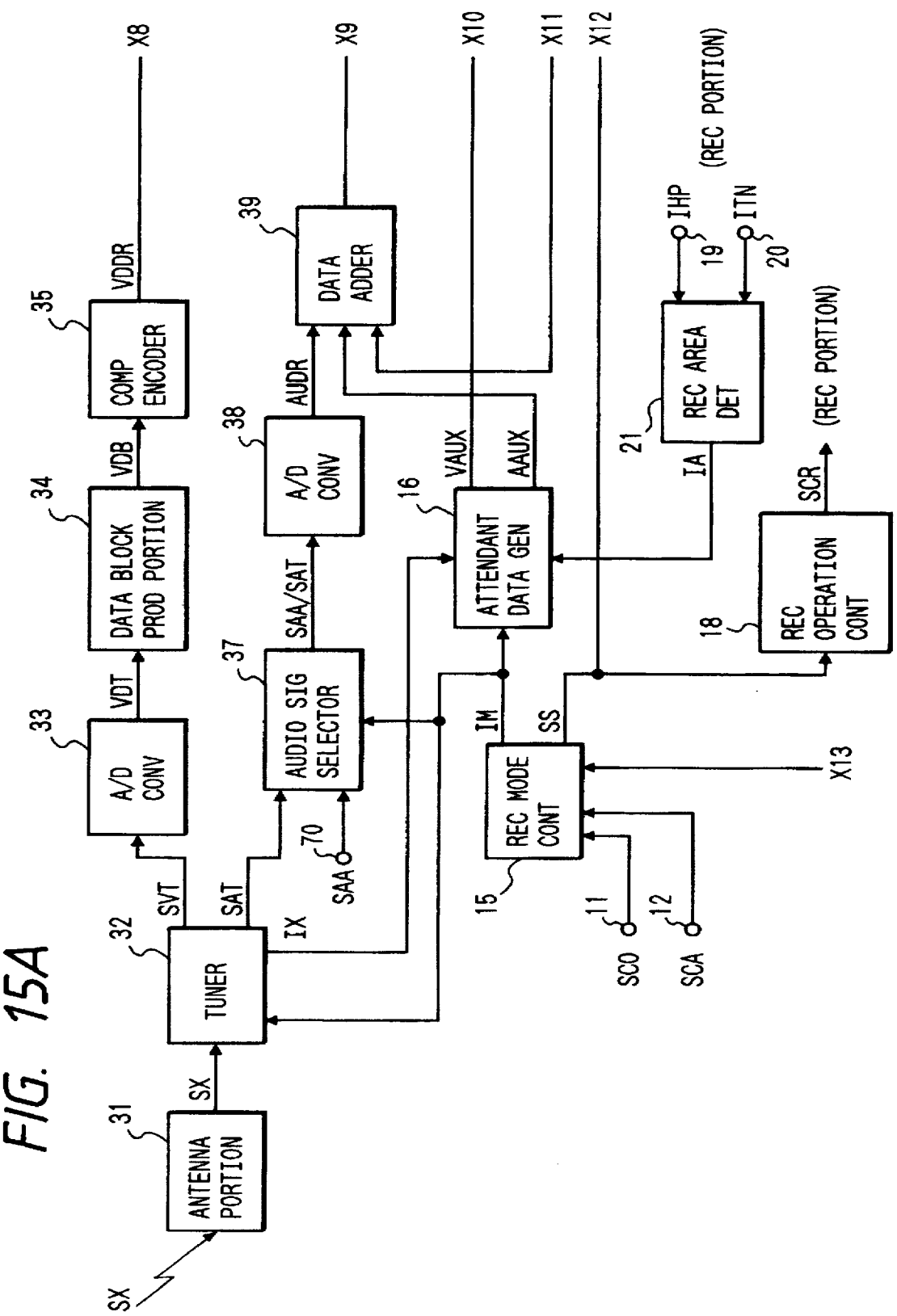
Figure 15B:
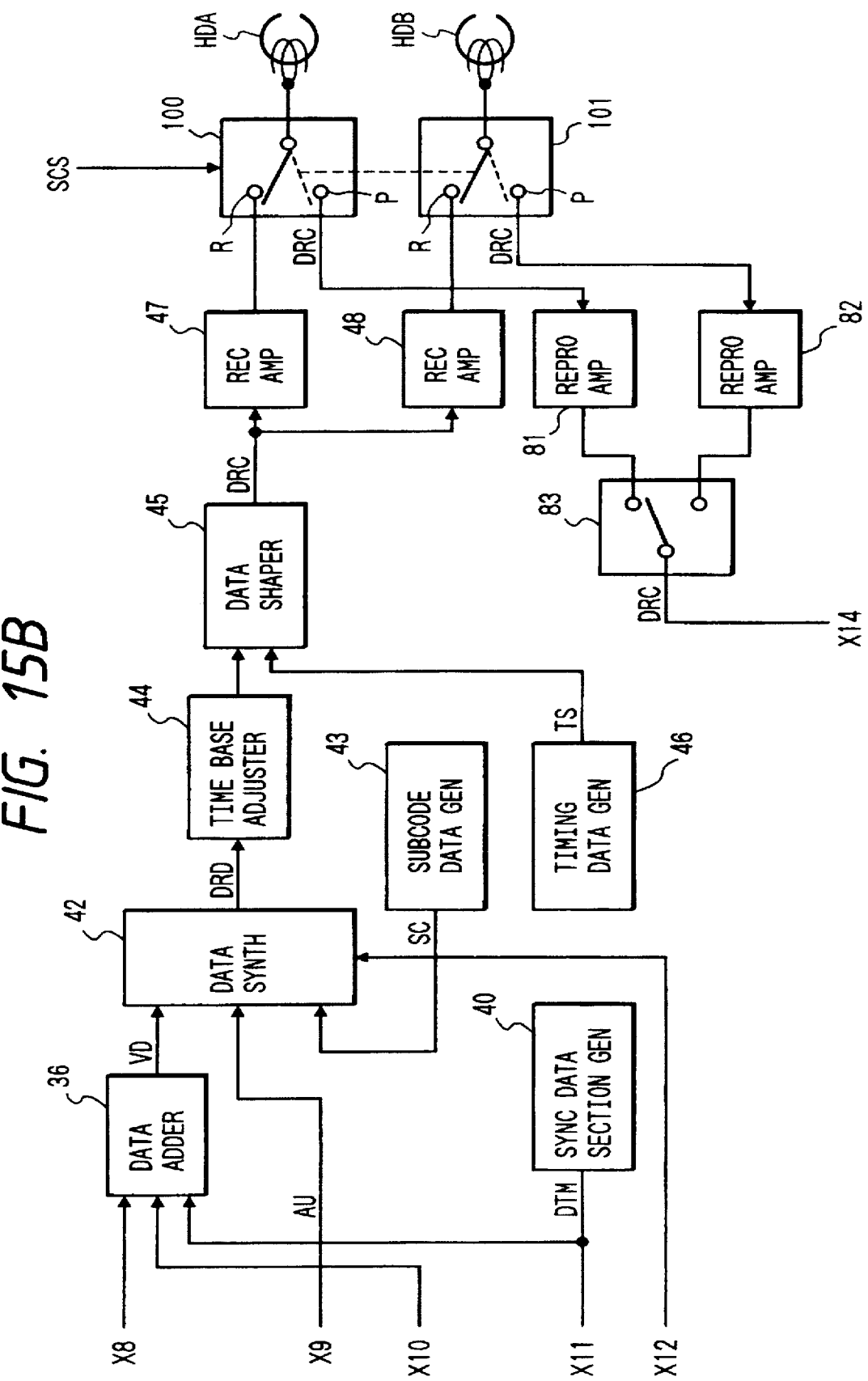

FIGS. 15A, 15B and 15C show an apparatus for recording and/or reproducing digital information including recording and reproducing sections by which another embodiment of apparatus for recording digital information, another embodiment of apparatus for reproducing digital information, and another embodiment of apparatus for recording and reproducing digital information according to the present invention are constituted.

The apparatus shown in FIGS. 15A, 15B and 15C comprises the recording area, the major part of which is constructed in a similar manner as the embodiment of apparatus for recording digital information shown in FIGS. 2A and 2B, and the reproducing section, the major part of which is constructed in a similar manner as the embodiment of apparatus for reproducing digital information shown in FIG. 14. In FIGS. 15A, 15B and 15C, blocks, parts, data and signals corresponding to those of FIGS. 2 and 14 are marked with the same references and further description thereof will be omitted.

Referring to FIGS. 15A, 15B and 15C, only a control signal terminal 11 and a control signal terminal 12 are provided for supplying respectively a mode designating signal SCO and a mode designating signal SCA to a recording mode controller 15 are provided, and there are no control signal terminals corresponding to the control signal terminals 13 and 14 provided in the embodiment shown in FIGS. 2A and 2B. Further, a switch 100 having a movable contact connected with a rotary magnetic head HDA and a couple of selective contacts R and P connected with the output terminal of a recording amplifier 47 which is contained in the recording area and the input terminal of a reproducing amplifier 81 which is contained in the reproducing section, respectively, and a switch 101 having a movable contact connected with a rotary magnetic head HDB and a couple of selective contacts R and P connected with the output terminal of a recording amplifier 48 which is contained in the recording area and the input terminal of a reproducing amplifier 82 which is contained in the reproducing section, respectively, are provided.

The movable contacts of the switches 100 and 101 are linked with each other and controlled by a switch control signal SCS in such a manner as to be connected to the respective selective contacts R when the recording operation is performed in the apparatus shown in FIGS. 15A, 15B and 15C and connected to the respective selective contacts P when the reproducing operation is performed in the apparatus shown in FIGS. 15A, 15B and 15C. Therefore, the rotary magnetic heads HDA and HDB are used for both the recording operation and the reproducing operation.

In the apparatus shown in FIGS. 15A, 15B and 15C, when the rotary magnetic heads HDA and HDB are connected through the switches 100 and 101 with the recording amplifiers 47 and 48, respectively, the recording area including the recording amplifiers 47 and 48 performs the recording operation in substantially the same manner as the embodiment of apparatus for recording digital information as shown in FIGS. 2A and 2B, and when the rotary magnetic heads HDA and HDB are connected through the switches 100 and 101 with the reproducing amplifiers 81 and 82, respectively, the reproducing section including the reproducing amplifiers 81 and 82 performs the reproducing operation in substantially the same manner as the embodiment of apparatus for reproducing digital information as shown in FIG. 14.

Further, in the apparatus shown in FIGS. 15A, 15B and 15C, data packs having various kinds of pack titles are also prepared as data packs PCDF and PCDA to include a data pack having its pack title "SOURCE CONT" which represents information of signals to be recorded on a magnetic tape. As the data pack having its pack title "SOURCE CONT", a S. P. constituting first attendant data VAUX added to digital video information data VDDR and a S. P. constituting second attendant data AAUX added to digital audio information data AUDR are prepared.

The S. P. constituting the first attendant data VAUX added to the digital video information data VDDR is formed in the same manner as that shown in FIG. 11. The S. P. constituting the second attendant data AAUX added to the digital audio information data AUDR is formed, as shown in FIG. 16, to have the pack header data PC0 of a code "0 1 1 1 0 0 1 1" so as to indicate to constitute the second attendant data AAUX.

In the S. P. constituting the second attendant data AAUX, pack data PC1 contain data "AU SIZE" relative to the amount of excess data or diminished data at 6 bits on the side of the LSB thereof, data "SYNC" relative to the synchronization at 1 bits higher than the bits for data "AU SIZE", and data "5‰" relative to frequency 50 Hz or 60 Hz for recording at the MSB thereof. Pack data PC2 contain audio signal mode data "AUDIO MODE" relative to an audio signal mode at 4 bits on the side of the LSB thereof, specific mode data "PAIR" relative to a specific audio signal mode at 2 bits higher than the bits for audio signal mode data "AUDIO MODE", data "CH" relative to the number of recording channels of digital audio information data at 2 bits higher than the bits for specific mode data "PAIR", and data "HD" relative to record tracks on which digital audio information data are recorded at the MSB thereof. Pack data PC3 contain data "QU" relative to the bit number of quantization at 3 bits on the side of the LSB thereof, data "SMP" relative to a sampling frequency at 3 bits higher than the bits for data "SMP", and data "EMP" relative to a emphasis condition at 2 bit on the side of the MSB thereof. Pack data PC4 contain 8 reserve bits all over.

In the S. P. constituting the second attendant data AAUX as described above, the audio signal mode data "AUDIO MODE" indicate the signal mode of the audio signal from which the digital audio information data AUDR to which the second attendant data AAUX are added are originated (the audio signal mode), and the specific mode data "PAIR" indicate whether or not the audio signal from which the digital audio information data AUDR are originated is of the specific audio signal mode. The specific audio signal mode is defined as such an audio signal mode that a recording state wherein subsections of the digital audio information data which are recorded respectively on recording areas AA1 and AA2 allocated on each record track group of ten adjacent record tracks KT on the magnetic tape MT shown in FIG. 1 are correlative with each other is established.

An example of the relationship among the audio signal mode, the specific mode data "PAIR" and the audio signal mode data "AUDIO MODE" is shown in FIG. 17. In the relationship shown in FIG. 17, twelve kinds of audio signal modes are picked up.

Audio signal mode "3-1 SYSTEM" is a mode for audio signals of four channels including a left signal, a right signal, a center signal and a surround signal. In the case of the audio signal mode "3-1 SYSTEM", subsections L and R of the digital audio information data based on the left and right signals, respectively, are recorded on the recording area AA1 and subsections C and S of the digital audio information data based on the center and surround signals, respectively, are recorded on the recording area AA2. The subsections L and R recorded on the recording area AA1 and the subsections C and S recorded on the recording area AA2 are correlative with each other.

Audio signal mode "2-2 SYSTEM" is a mode for audio signals of four channels including a front left signal, a front right signal, a rear left signal and a rear right signal. In the case of the audio signal mode "2-2 SYSTEM", subsections LF and RF of the digital audio information data based on the front left and front right signals, respectively, are recorded on the recording area AA1 and subsections LR and RR of the digital audio information data based on the rear left and rear right signals, respectively, are recorded on the recording area AA2. The subsections LF and RF recorded on the recording area AA1 and the subsections LR and RR recorded on the recording area AA2 are correlative with each other.

Audio signal mode "3-CHANNEL" is a mode for audio signals of three channels including a left signal, a right signal and a center signal. In the case of the audio signal mode "3-CHANNEL", subsections L and R of the digital audio information data based on the left and right signals, respectively, are recorded on the recording area AA1 and subsection C of the digital audio information data based on the center signal is recorded on the recording area AA2. The subsections L and R recorded on the recording area AA1 and the subsection C recorded on the recording area AA2 are correlative with each other.

Audio signal mode "3-CHANNEL+MONAURAL" is a mode for audio signals of four channels including a left signal, a right signal, a center signal and a monaural signal. In the case of the audio signal mode "3-CHANNEL+MONAURAL", subsections L and R of the digital audio information data based on the left and right signals, respectively, are recorded on the recording area AA1 and subsection C of the digital audio information data based on the center signal and subsection M of the digital audio information data based on the monaural signal are recorded on the recording area AA2. The subsections L and R recorded on the recording area AA1 and the subsections C and M recorded on the recording area AA2 are correlative with each other.

Audio signal mode "STEREO" is a mode for audio signals of two channels including a left signal and a right signal. In the case of the audio signal mode "STEREO", subsections L and R of the digital audio information data based on the left and right signals, respectively, are recorded on the recording area AA1 and no data are recorded on the recording area AA2.

Audio signal mode "STEREO+STEREO" is a mode for audio signals of four channels including two pairs of left and right signals. In the case of the audio signal mode "STEREO+STEREO", subsections L1 and R1 of the digital audio information data based on one of pairs of left and right signals, respectively, are recorded on the recording area AA1 and subsections L2 and R2 of the digital audio information data based on the other of pairs of left and right signals, respectively, are recorded on the recording area AA2. The subjections L1 and R1 recorded on the recording area AA1 and the subsections L2 and R2 recorded on the recording area AA2 are not correlative but independent respectively.

Audio signal mode "STEREO+MONAURAL" is a mode for audio signals of three channels including a pair of left and right signals and a monaural signal. In the case of the audio signal mode "STEREO+MONAURAL", subsections L and R of the digital audio information data based on the pair of left and right signals, respectively, are recorded on the recording area AA1 and subsection M of the digital audio information data based on the monaural signal is recorded on the recording area AA2. The subsections L and R recorded on the recording area AA1 and the subsection M recorded on the recording area AA2 are not correlative but independent respectively.

Audio signal mode "STEREO+BILINGUAL" is a mode for audio signals of four channels including a pair of left and right signals and a pair of monaural signals. In the case of the audio signal mode "STEREO+BILINGUAL", subsections L and R of the digital audio information data based on the pair of left and right signals, respectively, are recorded on the recording area AA1 and subsections M1 and M2 of the digital audio information data based on the pair of monaural signals, respectively, are recorded on the recording area AA2. The subsections L and R recorded on the recording area AA1 and the subsections M1 and M2 recorded on the recording area AA2 are not correlative but independent respectively.

Audio signal mode "MONAURAL" is a mode for a monaural audio signal of a single channel. In the case of the audio signal mode "MONAURAL", subsection M of the digital audio information data based on the monaural audio signal is recorded on the recording area AA1 and no data are recorded on the recording area AA2.

Audio signal mode "BILINGUAL" is a mode for audio signals of twochannels including a pair of monuaral signals. In the case of the audio signal mode "BILINGUAL", subsections M1 and M2 of the digital audio information data based on the pair of monaural signals, respectively, are recorded on the recording area AA1 and no data are recorded on the recording area AA2.

Audio signal mode "BILINGUAL+MONAURAL" is a mode for audio signals of three channels including a pair of monaural signals and another monaural signal. In the case of the audio signal mode "BILINGUAL+MONAURAL", subsections M1 and M2 of the digital audio information data based on the pair of monaural signals, respectively, are recorded on the recording area AA1 and subsection M of the digital audio information data based on another monaural signal is recorded on the recording area AA2. The subsections M1 and M2 recorded on the recording area AA1 and the subsection M recorded on the recording area AA2 are not correlative but independent respectively.

Audio signal mode "BILINGUAL+BILINGUAL" is a mode for audio signals of four channels including two pairs of monaural signals. In the case of the audio signal mode "BILINGUAL+BILINGUAL", subsections M1 and M2 of the digital audio information data based on one of two pairs of monaural signals, respectively, are recorded on the recording area AA1 and subsections M1' and M2' of the digital audio information data based on the other of two pairs of monaural signals, respectively, are recorded on the recording area AA2. The subsections M1 and M2 recorded on the recording area AA1 and the subsections M1' and M2' recorded on the recording area AA2 are not correlative but independent respectively.

The specific code data "PAIR" is set to be "1" in response to the audio signal mode "3-1 SYSTEM", "2-2 SYSTEM", "3-CHANNEL" or "3-CHANNEL+MONAURAL" and set to be "0" in response to the audio signal mode "STEREO", "STEREO+STEREO", "STEREO+MONAURAL", "STEREO+BILINGUAL", "MONAURAL", "BILINGUAL", "BILINGUAL+MONAURAL" or "BILINGUAL+BILINGUAL" on both of the recording areas AA1 and AA2.

On the other hand, the audio signal mode data "AUDIO MODE" is set to be "0 0 0 1" in response to the audio signal mode "3-1 SYSTEM", "2-2 SYSTEM", "3-CHANNEL", "3-CHANNEL+MONAURAL", "STEREO", "STEREO+STEREO", "STEREO+MONAURAL" or "STEREO+BILINGUAL", set to be "0 0 0 0" in response to the audio signal mode "MONAURAL", and set to be "0 0 1 0" in response to the audio signal mode "BILINGUAL", "BILINGUAL+MONAURAL" or "BILINGUAL+BILINGUALM" on the recording areas AA1, and further, set to be "0 0 1 1" in response to the audio signal mode "3-1 SYSTEM", set to be "0 1 0 0" in response to the audio signal mode "2-2 SYSTEM", set to be "0 1 0 1" in response to the audio signal mode "3-CHANNEL", set to be "0 1 1 0" in response to the audio signal mode "3-CHANNEL+MONAURAL", set to be "1 1 1 1" in response to the audio signal mode "STEREO", "MONAURAL" or "BILINGUAL", set to be "0 0 0 1" in response to the audio signal mode "STEREO+STEREO", set to be "0 0 0 0" in response to the audio signal mode "STEREO+MONAURAL" or "BILINGUAL+MONAURAL", and set to be "0 0 1 0" in response to the audio signal mode "STEREO+BILINGUAL" or "BILINGUAL+BILINGUALM" on the recording areas AA2.

When a recording operation mode is set in the apparatus shown in FIGS. 15A, 15B and 15C, first, the switches 100 and 101 are so controlled by the switch control signal SCS that the moving contact of the switch 100 is connected to the selective contract R and the moving contact of the switch 101 is also connected to the selective contract R.

The operation for recording under the original recording mode is carried out in almost the same manner as that by the embodiment of apparatus for recording digital information shown in FIGS. 2A and 2B, except the operation for producing the second attendant data AAUX in an attendant data generator 16.

Under the original recording mode, in the attendant data generator 16, the first attendant data VAUX are produced to contain the data packs PCDF and PCDA and the second attendant data AAUX are produced also to contain the data packs PCDF and PCDA. In particular, the specific mode data "PAIR" and the audio signal mode data "AUDIO MODE" in the S. P. constituting the second attendant data AAUX are given respective codes which are determined based on the signal made of an audio signal SAT represented by an information signal IX from a tuner 32 and the recording area indicated by a recording area detection output signal IA from a recording area detector 21 so as to satisfy the relationship shown in FIG. 17.

That is, the specific mode data "PAIR" in the S. P. constituting the second attendant data AAUX are given a code "1" when the recording area detection output signal IA indicates that the rotary magnetic head HDA or HDB is on one of the recording areas AA1 and AA2 under the situation wherein the information signal IX represents the specific audio signal mode and a code "0" on other occasions. Accordingly, the second attendant data AAUX contain the specific mode data "PAIR" which the code indicating whether or not the audio signal SAT is of the specific audio signal mode.

With the recording under the original recording mode, a section of composite digital video information data VD which corresponds to one frame period of video signal SVT and a section of composite digital audio information data AU which corresponds to the section of the composite digital video information data VD are recorded respectively on the recording areas VA, AA1 and AA2 allocated on the record track group of ten adjacent record tracks KT formed on the magnetic tape MT, as shown in FIG. 1. The recording of the subsections of the composite digital audio information data AU on the recording areas AA1 and AA2 is carried out in accordance with the relationship shown in FIG. 17.

When a reproducing operation mode is set in the apparatus shown in FIGS. 15A, 15B and 15C, first, the switches 100 and 101 are so controlled by the switch control signal SCS that the moving contact of the switch 100 is connected to the selective contract P and the moving contact of the switch 101 is also connected to the selective contract P. On the magnetic tape used for the reproduction by the apparatus shown in FIGS. 15A, 15B and 15C, record tracks are formed in the same manner as the record tracks KT on the magnetic tape MT shown in FIG. 1, and timing data TS, composite digital audio information data AU, composite digital video information data VD and composite subcode data SC arranged in such a manner as shown in FIG. 3 are recorded on each record track KT.

The operation for reproduction is carried out in almost the same manner as that by the embodiment of apparatus for reproducing digital information shown in FIG. 14, except the operation for reproducing information of the first attendant data VAUX in an attendant data information reproducing portion 94, the operation for reproducing information of the second attendant data AAUX in an attendant data information reproducing portion 99, and the operation for processing the digital audio information data AUDR in a data processor 96.

In the attendant data information reproducing portion 94, various kinds of information represented by the first attendant data VAUX supplied from a data divider 87 are reproduced, and an information detection output signal SVI representing the reproduced information is obtained from the attendant data information reproducing portion 94 and supplied to a reproducing operation controller 95.

In the attendant data information reproducing portion 99, various kinds of information represented by the second attendant data AAUX supplied from a data divider 88 are reproduced and, an information detection output signal SAI representing the reproduced information is obtained from the attendant data information reproducing portion 99 and supplied to the reproducing operation controller 95. The reproduced information represented by the information detection output signal SAI includes the information relative to the code of the audio signal mode data "AUDIO MODE" in the S. P. constituting the second attendant data AAUX, namely, the information of the signal mode of the audio signal SAT from which the digital audio information data AUDR are originated, and such information relative to the code of the audio signal mode data "AUDIO MODE" is transmitted to the data processor 96 by the information detection output signal SAI. Further, in the attendant data information reproducing portion 99, the code of the specific mode data "PAIR" in the S. P. constituting the second attendant data AAUX is detected, and a specific mode data detection output signal SPR representing the detected code of the specific mode data "PAIR" is obtained from the attendant data information reproducing portion 99 and supplied to the data processor 96.

In the data processor 96, the digital audio information data AUDR obtained from the data divider 88 are subjected to appropriate data processings for reproduction which are carried out on the strength of the code of the audio signal mode data "AUDIO MODE" and the code of the specific mode data "PAIR".

Then, when the mode designating signal SCA is supplied to the control signal terminal 12 and the after recording mode is designated, the reproducing operation mode is set once when each of the rotary magnetic heads HDA and HDB scans the recording area AA1 prior to the scanning on the recording area AA2. During the reproduction thus carried out by each of the rotary magnetic heads HDA and HDB scanning the recording area AA1, the code of the specific mode data "PAIR" in the S. P. constituting the second attendant data AAUX is detected in the attendant data information reproducing portion 99 and the specific mode data detection output signal SPR representing the detected code of the specific mode data "PAIR" is supplied from the attendant data information reproducing portion 99 to the recording mode controller 15. In the recording mode controller 15 to which the specific mode data detection output signal SPR is supplied, it is checked, based on the code of the specific mode data "PAIR" represented by the specific mode data detection output signal SPR, whether or not the audio signal SAT from which the digital audio information data AUDR have been originated is of the specific audio signal mode. In other words, it is checked by the recording mode controller 15 whether or not the subsections of the digital audio information data AUDR having been recorded on the recording areas AA1 and AA2, respectively, are correlated with each other.

As the result of the check, if the subsections of the digital audio information data AUDR having been recorded on the recording areas AA1 and AA2, respectively, are correlated with each other, it is understood that the recording under the after recording mode should not be carried out on the recording areas AA1 and AA2 in the recording mode controller 15 and a control signal SS corresponding to the after recording mode is not forwarded from the recording mode controller 15. In such a case, the operation for recording under the after recording mode is not performed in a recording portion. Consequently, the subsections of the digital audio information data AUDR having been recorded on the recording areas AA1 and AA2, respectively, so as to be correlated with each other are protected from damages resulted from the recording under the after recording mode carried out carelessly.

On the other hand, it is clarified by the check in the recording mode controller 15 that the subsections of the digital audio information data AUDR having been recorded on the recording areas AA1 and AA2, respectively, are not correlated but independent respectively, the control signal SS corresponding to the after recording mode is forwarded from the recording mode controller 15, and therefore, the operation for recording under the after recording mode is performed in the recording portion. On that occasion, the switches 100 and 101 are controlled to have their movable contacts connected to the corresponding selective contacts R so as to set the recording operation mode before each of the rotary magnetic heads HDA and HDB starts to scan the recording area AA2. The recording under the after recording mode is carried out in almost the same manner as the recording under the after recording mode in the embodiment of apparatus for recording digital information shown in FIGS. 2A and 2B.

What is claimed is:

1. An apparatus for recording digital information comprising:

first digitalizing means for digitalizing a video signal to produce digital video information data based on the video signal;

second digitalizing means for digitalizing an audio signal to produce digital audio information data based on the audio signal;

attendant data generating means for producing first attendant data to be added to the digital video information data and second attendant data to be added to the digital audio information data;

recording data generating means for producing recording digital information data containing at least one of the digital video information data accompanied with the first attendant data added thereto and the digital audio information data accompanied with the second attendant data added thereto;

recording means operative to record the recording digital information data in a plurality of inclined tracks on a record medium; and control means operative to set one of a plurality of recording modes selected from among an original recording mode, an after recording mode and an insert recording mode for the recording of the recording digital information data on the record medium carried out by the recording means;

wherein said first attendant data and said second attendant data each contains recording mode data corresponding to the recording mode set by said control means.

2. An apparatus according to claim 1, wherein said first digitalizing means is operative to produce the digital video information data in the form of a series of data blocks, said second digitalizing means is operative to produce the digital audio information data in the form of a series of data blocks, and said attendant data generating means is operative to produce the first attendant data to be added to each data block of the digital video information data and the second attendant data to be added to each data block of the digital audio information data.

3. An apparatus according to claim 2, wherein said attendant data generating means is operative to produce said recording mode data to have selectively a specific code indicating that the digital video information data are not to be recorded on the record medium.

4. An apparatus for recording digital information comprising:

first digitalizing means for digitalizing a video signal to produce digital video information data based on the video signal;

second digitalizing means for digitalizing an audio signal to produce digital audio information data based on the audio signal;

attendant data generating means for producing first attendant data to be added to the digital video information data and second attendant data to be added to the digital audio information data;

recording data generating means for producing recording digital information data containing at least one of the digital video information data accompanied with the first attendant data added thereto and the digital audio information data accompanied with the second attendant data added thereto;

recording means operative to record the recording digital information data in sections in a plurality of inclined tracks on a record medium; and control means operative to set one of a plurality of recording modes selected from among an original recording mode, an after recording mode and an insert recording mode for the recording of the recording digital information data on the record medium carried out by the recording means;

wherein said attendant data generating means is operative to produce the second attendant data so as to contain specific mode data indicating whether or not the audio signal supplied to said second digitalizing means is of a specific audio signal mode, said recording means is operative to record each section of the digital audio information data on the record medium in such a manner that first and second subsections constituting a section of the digital audio information data are recorded on corresponding first and second recording areas on the record medium, respectively, said section of the digital audio information data being formed to correspond to a section of the digital video information data corresponding to a predetermined unit period of the video signal, and said attendant data generating means is operative to produce said specific mode data to indicate whether or not said first and second subsections recorded on said first and second recording areas, respectively, are correlative with each other.

5. An apparatus according to claim 4, wherein said first digitalizing means is operative to produce the digital video information data in the form of a series of data blocks, said second digitalizing means is operative to produce the digital audio information data in the form of a series of data blocks, and said attendant data generating means is operative to produce the first attendant data to be added to each data block of the digital video information data and the second attendant data to be added to each data block of the digital audio information data.

6. An apparatus for reproducing digital information comprising:

means for reproducing from a record medium recording digital information data containing digital video information data accompanied with first attendant data added thereto and digital audio information data accompanied with second attendant data added thereto, said recording digital information data having been recorded in a plurality of inclined tracks on said record medium in accordance with a predetermined recording mode selected from among an original recording mode, an after recording mode and an insert recording mode, said first attendant data and said second attendant data being indicative of said predetermined recording mode;

means for separating at least one of the digital video information data accompanied with the first attendant data added thereto and the digital audio information data accompanied with the second attendant data added thereto from the recording digital information data reproduced from the record medium;

first dividing means for dividing the digital video information data accompanied with the first attendant data added thereto into the digital video information data and the first attendant data;

second dividing means for dividing the digital audio information data accompanied with the second attendant data added thereto into the digital audio information data and the second attendant data;

means for detecting said predetermined recording mode based on the first and second attendant data obtained from said first and second dividing means, respectively;

means for processing the digital video information data obtained from said first dividing means to produce a video signal in accordance with said detected predetermined recording mode; and means for processing the digital audio information data obtained from said second dividing means to produce an audio signal in accordance with said detected predetermined recording mode.

7. An apparatus for reproducing digital information comprising:

data reproducing means operative to reproduce recording digital information data containing digital video information data accompanied with first attendant data added thereto and digital audio information data accompanied with second attendant data added thereto from a plurality of inclined tracks of a record medium on which said recording digital information data have been recorded in accordance with a recording mode selected from among an original recording mode, an after recording mode and an insert recording mode, said digital audio information data accompanied with the second attendant data being divided into first and second subsections, said first and second subsections being recorded on corresponding first and second recording areas on said recording medium;

data separating means for separating at least one of the digital video information data accompanied with the first attendant data added thereto and the digital audio information data accompanied with the second attendant data added thereto from the recording digital information data reproduced from the record medium;

first data dividing means for dividing the digital video information data accompanied with the first attendant data added thereto into the digital video information data and the first attendant data;

second data dividing means for dividing the digital audio information data accompanied with the second attendant data added thereto into the digital audio information data and the second attendant data;

video data processing means for processing the digital video information data obtained from said second data dividing means to produce an audio signal;

audio data processing means for processing the digital audio information data obtained from said second data dividing means to produce an audio signal; and information reproducing means operative to obtain information based on the first and second attendant data obtained from said first and second data dividing means, respectively, and including a part thereof corresponding to specific mode data contained in said second attendant data, said specific mode data being indicative of whether or not said first and second subsections recorded on said first and second recording areas, respectively, are correlative with each other.

8. An apparatus for recording and reproducing digital information comprising:

means for digitalizing a video signal to produce digital video information data based on the video signal;

means for digitalizing an audio signal to produce digital audio information data based on the audio signal;

means for producing first attendant data to be added to the digital video information data and second attendant data to be added to the digital audio information data;

means for producing recording digital information data containing at least one of the digital video information data accompanied with the first attendant data added thereto and the digital audio information data accompanied with the second attendant data added thereto;

recording means operative to record the recording digital information data in a plurality of inclined tracks on a record medium;

control means operative to set one of a plurality of recording modes selected from among an original recording mode, an after recording mode and an insert recording mode for the recording of the recording digital information data on the record medium carried out by the recording means, wherein said first attendant data and said second attendant data each contains recording mode data corresponding to and indicative of said recording mode set by said control means;

means for reproducing said recording digital information data from the record medium;

means for separating at least one of the digital video information data accompanied with the first attendant data added thereto and the digital audio information data accompanied with the second attendant data added thereto from the recording digital information data reproduced from the record medium;

first dividing means for dividing the digital video information data accompanied with the first attendant data added thereto into the digital video information data and the first attendant data;

second dividing means for dividing the digital audio information data accompanied with the second attendant data added thereto into the digital audio information data and the second attendant data;

means for detecting said predetermined recording mode based on the first and second attendant data obtained from said first and second dividing means, respectively;

means for processing the digital video information data obtained from said first dividing means to produce the video signal in accordance with said detected predetermined recording mode; and means for processing the digital audio information data obtained from said second dividing means to produce the audio signal in accordance with said detected predetermined recording mode.

9. An apparatus for recording and reproducing digital information comprising:

first digitalizing means for digitalizing a video signal to produce digital video information data based on the video signal;

second digitalizing means for digitalizing an audio signal to produce digital audio information data based on the audio signal;

attendant data generating means for producing first attendant data to be added to the digital video information data and second attendant data to be added to the digital audio information data;

recording data generating means for producing recording digital information data containing at least one of the digital video information data accompanied with the first attendant data added thereto and the digital audio information data accompanied with the second attendant data added thereto;

recording means operative to record the recording digital information data in a plurality of inclined tracks on a record medium in accordance with a recording mode selected from among an original recording mode, an after recording mode and an insert recording mode, said digital audio information data accompanied with the second attendant data added thereto being divided into first and second subsections, said first and second subsections being recorded on corresponding first and second recording areas on said recorded medium, wherein said second attendant data contains specific mode data indicating whether or not said first and second subsections recorded on said first and second recording areas, respectively, are correlative with one another;

control means operative to set selectively one of a plurality of recording modes for the recording of the recording digital information data on the record medium carried out by the recording means;

data reproducing means operative to reproduce said recording digital information data from the record medium;

data separating means for separating at least one of the digital video information data accompanied with the first attendant data added thereto and the digital audio information data accompanied with the second attendant data added thereto from the recording digital information data reproduced from the record medium, said reproduced second attendant data including said specific mode data;

first data dividing means for dividing the digital video information data accompanied with the first attendant data added thereto into the digital video information data and the first attendant data;

second data dividing means for dividing the digital audio information data accompanied with the second attendant data added thereto into the digital audio information data and the second attendant data;

video data processing means for processing the digital video information data obtained from said first data dividing means to produce the video signal;

audio data processing means for processing the digital audio information data obtained from said second data dividing means to produce the audio signal; and information reproducing means operative to obtain information based on the first and second attendant data obtained from said first and second data dividing means, respectively, said information reproducing means being further operative to determine based on said specific mode data whether or not said first and second subsections recorded on said first and second recording areas, respectively, are correlative with one another.

10. An apparatus according to claim 2, wherein said first attendant data comprises a first plurality of data packs and said second attendant data comprises a second plurality of data packs, said first plurality of data packs being divided into a first fundamental data portion and a first additional data portion, said second plurality of data packs being divided into a second fundamental portion and a second additional data portion, said first fundamental data portion and said second fundamental data portion being respectively recorded before said first additional data portion and said second additional data portion in a first plurality of recording tracks on said record medium, and said first fundamental data portion and said second fundamental data portion being respectively recorded after said first additional data portion and said second additional data portion in a second plurality of recording tracks on said record medium.

11. An apparatus according to claim 4, wherein said second digitalizing means includes an audio signal selector, said audio signal selector being supplied with said audio signal and an additional audio signal, said audio signal selector selecting said audio signal for recording on said record medium during an original recording mode of operation and said audio selector selecting said additional audio signal for recording on said record medium in an after recording mode of operation, said additional audio signal being recorded in one of said first and second recording areas during said after recording mode, wherein said control means inhibits said recording means during said after recording mode of operation based on said specific mode data when said first and second subsections recorded on said first and second recording areas, respectively, are correlative with each other.

* * * * *